United States Patent
Prakash et al.

(10) Patent No.: US 12,355,623 B2
(45) Date of Patent: Jul. 8, 2025

(54) CONFIGURATION CHECKING OF ASSET PROTECTION INFRASTRUCTURE

(71) Applicant: Dell Products L.P., Round Rock, TX (US)

(72) Inventors: Chandra Prakash, Bangalore (IN); Upanshu Singhal, Bangalore (IN); Ashish Kumar, Bangalore (IN)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 18/301,506

(22) Filed: Apr. 17, 2023

(65) Prior Publication Data

US 2024/0348502 A1 Oct. 17, 2024

(51) Int. Cl.
| | |
|---|---|
| *H04L 41/0866* | (2022.01) |
| *H04L 41/0853* | (2022.01) |
| *H04L 41/12* | (2022.01) |
| *H04L 43/08* | (2022.01) |

(52) U.S. Cl.
CPC ...... *H04L 41/0866* (2013.01); *H04L 41/0853* (2013.01); *H04L 41/0856* (2013.01); *H04L 41/12* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 8,417,895 B1 * | 4/2013 | de la Iglesia | G06F 3/0614 711/159 |
| 9,294,346 B2 * | 3/2016 | Perkins | H04L 65/80 |
| 11,005,935 B1 | 5/2021 | Littlefield | |
| 11,457,073 B1 * | 9/2022 | Pilkauskas | H04L 67/56 |
| 11,593,219 B2 | 2/2023 | Upadhyay | |
| 2013/0111038 A1 * | 5/2013 | Girard | H04L 47/801 709/226 |

(Continued)

FOREIGN PATENT DOCUMENTS

| | | |
|---|---|---|
| CN | 101753640 B  * | 11/2011 |
| CN | 114978584 A | 8/2022 |
| KR | 100678825 B1 * | 5/2007 |

*Primary Examiner* — Lance Leonard Barry
(74) *Attorney, Agent, or Firm* — Chamberlain Hrdlicka; Aly Z. Dossa

(57) ABSTRACT

A method for checking of asset protection infrastructure includes: receiving a request specifying an asset source, an asset, and a target storage; performing a check of the asset source to obtain an asset source configuration state; performing a second check of the target storage to obtain a target storage configuration state; extracting an asset source connection attempt result from the asset source configuration state; extracting a target storage connection attempt result from the target storage configuration state; making a determination that the asset source connection attempt result and target storage connection attempt result both reflect a successful result; performing, based on the determination, an asset backup configuration check of a backup operation involving the asset to obtain an asset backup configuration state; generating a response including the asset source configuration state, asset backup configuration state, and target storage configuration state; and returning the response in response to the request.

16 Claims, 22 Drawing Sheets

(56) References Cited

U.S. PATENT DOCUMENTS

2020/0295991 A1\* 9/2020 Shetty .................... H04L 41/12
2021/0149587 A1\* 5/2021 Lukoshkov ............ G06F 21/53
2022/0342769 A1 10/2022 Brenner
2022/0398165 A1\* 12/2022 Bijoy ................. G06F 11/1469

\* cited by examiner

CONFIGURATION CHECKING OF ASSET PROTECTION INFRASTRUCTURE

BACKGROUND

During the deployment and configuration stage for a backup workload entailing any number of assets (e.g., local storage, network attached storage (NAS) shares, virtual machines, and database applications, etc.), the administrator(s) of any enterprise information technology (IT) environment often face configuration and infrastructural challenges when they onboard their asset sources to perform protection operations.

SUMMARY

In general, in one aspect, embodiments described herein relate to a method for configuration checking of asset protection infrastructure. The method includes: receiving a configuration check request specifying an asset source and a target storage; performing an asset source configuration check of the asset source to obtain asset source configuration state; performing a target storage configuration check of the target storage to obtain target storage configuration state; generating a configuration check response including the asset source configuration state and the target storage configuration state; and returning the configuration check response in response to the configuration check request.

In general, in one aspect, embodiments described herein relate to a non-transitory computer readable medium (CRM). The non-transitory CRM includes computer readable program code, which when executed by a computer processor, enables the computer processor to perform a method for configuration checking of asset protection infrastructure. The method includes: receiving a configuration check request specifying an asset source and a target storage; performing an asset source configuration check of the asset source to obtain asset source configuration state; performing a target storage configuration check of the target storage to obtain target storage configuration state; generating a configuration check response including the asset source configuration state and the target storage configuration state; and returning the configuration check response in response to the configuration check request.

In general, in one aspect, embodiments described herein relate to a system. The system includes: an asset source; a target storage; and a proxy node operatively connected to the asset source and the target storage, and including a computer processor configured to perform a method for configuration checking of asset protection infrastructure. The method includes: receiving a configuration check request specifying the asset source and the target storage; performing an asset source configuration check of the asset source to obtain asset source configuration state; performing a target storage configuration check of the target storage to obtain target storage configuration state; generating a configuration check response including the asset source configuration state and the target storage configuration state; and returning the configuration check response in response to the configuration check request.

Other aspects described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Figure 1A:
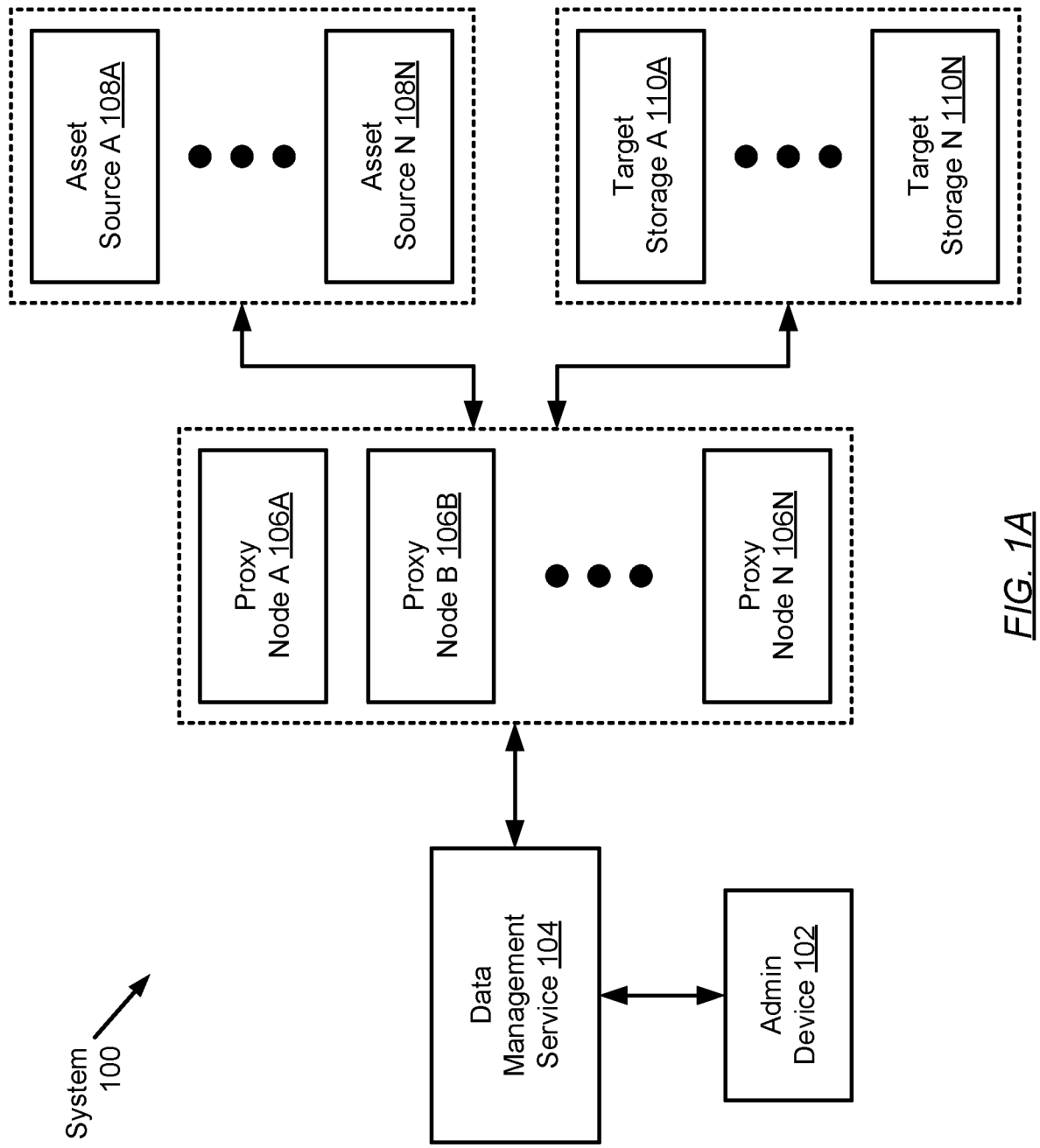
FIG. 1A shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to configuration checking for asset protection infrastructure. Particularly, during the deployment and configuration stage for a backup workload entailing any number of assets (e.g., local storage, network attached storage (NAS) shares, virtual machines, and database applications, etc.), the administrator(s) of any enterprise information technology (IT) environment often face configuration and infrastructural challenges when they onboard their asset sources to perform protection operations. While configuring a protection policy, the objective of the administrator(s) is to make sure that their backup and/or restoration operation(s) complete(s) successfully and should not have any environmental issues. The administrator(s) may understand the environment, however may not be very sure if the environment is configured to fulfill the data protection requirements.

Embodiments described herein, accordingly, implement a solution addressing the above-mentioned issues by way of configuration checking for asset protection infrastructure. More specifically, the solution provides an automated configuration utility focusing on ascertaining a current viability of the asset protection infrastructure to enable/support asset data and/or metadata protection (e.g., via any number of backup and/or restore operations). Further, said configuration checking may be broken down into the performance of one or more of the following procedures: an asset source configuration check respective to an asset source; a target storage configuration check respective to a target storage; and asset backup and/or asset restore configuration check(s) respective to an asset. Moreover, one or more configuration states (e.g., asset source configuration state, target storage configuration state, asset backup configuration state, and/or asset restore configuration state) may be obtained via completion of said aforementioned procedure(s), where administrators, in examining said configuration state(s), may enact corrective actions (e.g., verify and update user credentials in case of asset access failure, modify asset permissions in case of read/write operation failure, modify asset source and/or target storage network connection(s) in case of insufficient bandwidth and/or throughput performance indicators, etc.) directed to maximizing the success rate of backup and/or restoration operation(s) configured to protect any number of assets across the enterprise IT environment.

FIG. 1A shows a system in accordance with one or more embodiments described herein. The system (100) may reference asset protection infrastructure, or more specifically, any enterprise information technology (IT) environment at least configured to facilitate the protection (e.g., via backup and/or restore operations) of any granularity of data and/or metadata (descriptive of said data) pertinent to, for example, enterprise operations and services. To that end, the system (100) may include an admin device (102), a data management service (104), any number of proxy nodes (106A-106N), any number of asset sources (108A-108N), and any number of target storages (110A-110N). Each of these system (100) components is described below.

In one or many embodiment(s) described herein, the admin device (102) may represent any physical appliance or computing system operated by one or many administrator(s) of the system (100). An administrator may refer to an individual or entity whom may be responsible for overseeing system (100) operations and maintenance. To that end, the admin device (102) may include functionality to: control the data management service (104) in order to configure and execute any number of asset protection policies (see e.g., FIG. 1B) for any number of assets (see e.g., FIG. 1D). One of ordinary skill, however, will appreciate that the admin device (102) may perform other functionalities without departing from the scope of the embodiments described herein. Examples of the admin device (102) may include, but may not be limited to, a desktop computer, a laptop computer, a network server, a network mainframe, a smartphone, a tablet computer, or any other computing system similar to the exemplary computing system illustrated and described with respect to FIG. 7, below.

In one or many embodiment(s) described herein, the data management service (104) may represent any enterprise information technology (IT) infrastructure at least configured to orchestrate, and thus centralize, asset (see e.g., FIG. 1D) discovery, protection, and governance. To that end, the data management service (104) may include functionality to: generate and submit, to any proxy node (106A-106N), any number of configuration check requests, each specifying an asset source (108A-108N), an asset hosted on or accessible through the asset source (108A-108N), and a target storage (110A-110N); and receive, from said proxy node(s) (106A-106N), any number of configuration check responses regarding the submitted configuration check request(s), where each configuration check response may include configuration state pertaining to: the specified asset source (108A-108N), the specified target storage (110A-110N), an asset backup workflow entailing the specified asset; and an asset restore workflow entailing the specified asset. One of ordinary skill, however, will appreciate that the data management service (104) may perform other functionalities without departing from the scope of the embodiments described herein.

In one or many embodiment(s) described herein, the data management service (104) may be implemented through on-premises infrastructure, cloud computing infrastructure, or any hybrid infrastructure thereof. The data management service (104), accordingly, may be implemented using one or more network servers (not shown), where each network server may represent a physical or a virtual network server.

Additionally, or alternatively, the data management service (104) be implemented using one or more computing systems similar to the exemplary computing system illustrated and described with respect to FIG. 7, below. Moreover, the data management service (104) is illustrated and described in further detail with respect to FIG. 1B, below.

Figure 2A:
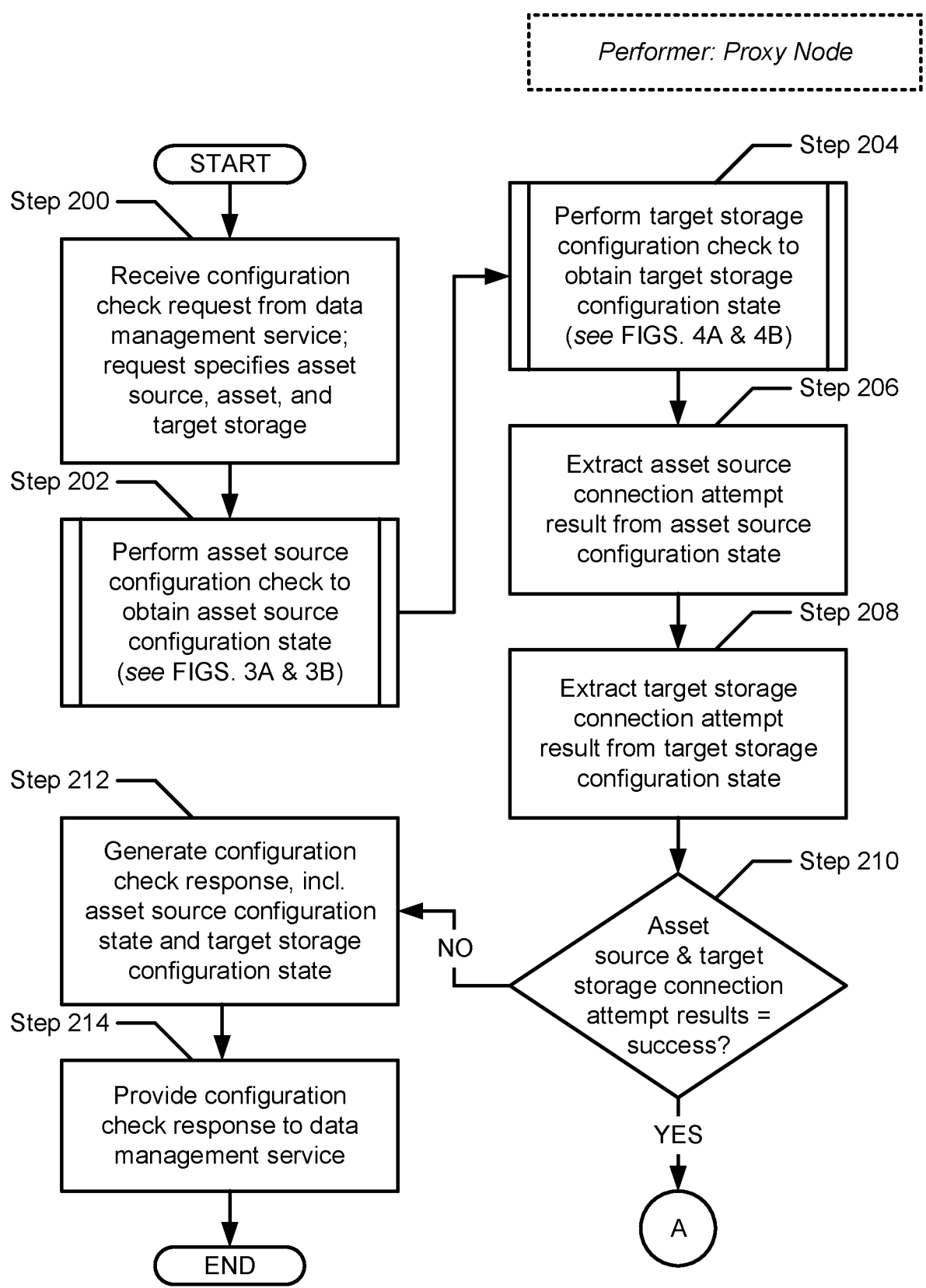
FIGS. 2A and 2B show flowcharts describing a method for configuration checking of asset protection infrastructure in accordance with one or more embodiments described herein.
Figure 2B:
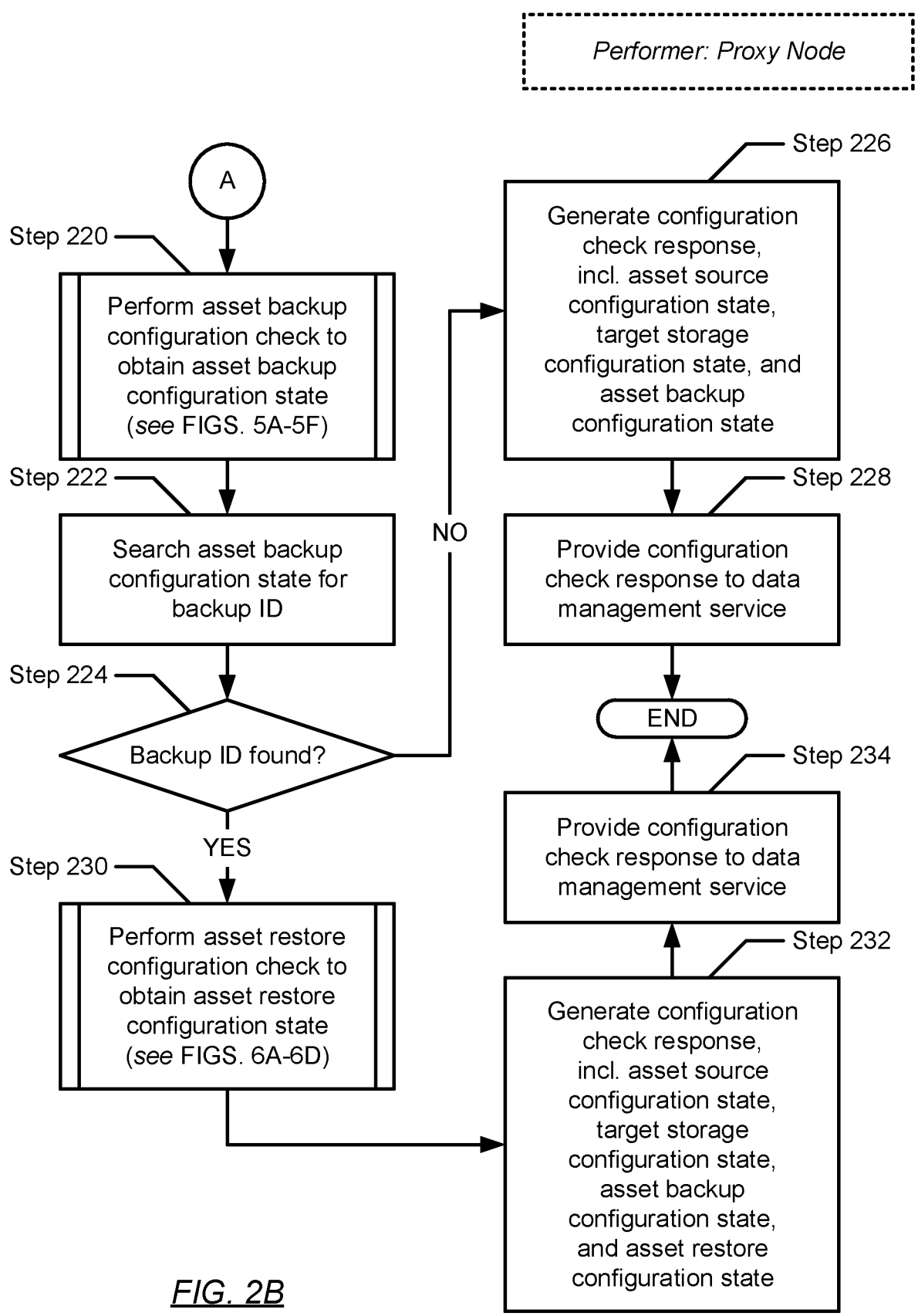

In one or many embodiment(s) described herein, any proxy node (106A-106N) may represent any physical or virtual appliance (or computing system) at least configured to implement, on behalf or authority of the data management service (104), configuration checking of asset protection infrastructure (see e.g., FIGS. 2A and 2B). To that end, any proxy node (106A-106N) may include functionality to: implement asset source configuration checking (see e.g., FIGS. 3A and 3B); implement target storage configuration checking (see e.g., FIGS. 4A and 4B); implement asset backup configuration checking (see e.g., FIGS. 5A-5F); and implement asset restore configuration checking (see e.g., FIGS. 6A-6D). One of ordinary skill, however, will appreciate that any proxy node (106A-106N) may perform other functionalities without departing from the scope of the embodiments described herein.

In one or many embodiment(s) described herein, any proxy node (106A-106N) may be implemented through on-premises infrastructure, cloud computing infrastructure, or any hybrid infrastructure thereof. Any proxy node (106A-106N), accordingly, may be implemented using one or more network servers (not shown), where each network server may represent a physical or a virtual network server. Additionally, or alternatively, any proxy node (106A-106N) be implemented using one or more computing systems similar to the exemplary computing system illustrated and described with respect to FIG. 7, below. Moreover, any proxy node (106A-106N) is illustrated and described in further detail with respect to FIG. 1C, below.

In one or many embodiment(s) described herein, any asset source (108A-108N) may represent any physical appliance or computing system configured to receive, generate, process, store, and/or transmit data (and metadata descriptive thereof), as well as to provide an environment in which any number of computer programs and/or assets (see e.g., FIG. 1D) may execute or be maintained thereon. The computer program(s) may, for example, implement large-scale and complex data processing; or implement one or more services offered locally or over a network, whereas the asset(s) may retain the vast quantities of data and state pertinent to enterprise operations and/or services.

Further, in one or many embodiment(s) described herein, in providing an execution environment for any computer program(s) installed thereon, any asset source (108A-108N) may include and allocate various resources (e.g., computer processors, memory, storage, virtualization, network bandwidth, etc.), as needed, to the computer program(s) and/or the tasks (or processes) instantiated thereby. One of ordinary skill, however, will appreciate that any asset source (108A-108N) may perform other functionalities without departing from the scope of the embodiments described herein. Examples of any asset source (108A-1048N) may include, but may not be limited to, a desktop computer, a laptop computer, a network server, a network mainframe, a smartphone, a tablet computer, or any other computing system similar to the exemplary computing system illustrated and described with respect to FIG. 7, below. Moreover, any asset source (1084A-108N) is illustrated and described in further detail with respect to FIG. 1D, below.

In one or many embodiment(s) described herein, any target storage (110A-110N) may represent any information backup, archiving, and/or disaster recovery storage system. Any target storage (110A-110N) may be implemented using one or many storage server(s) (not shown). Each storage server may refer to a physical network server, or a virtual network server, that resides, or may be implemented, on a cloud computing environment. Additionally, or alternatively, the target storage (106) may be implemented using one or many computing system(s) similar to the exemplary computing system illustrated and described with respect to FIG. 7, below, where said computing system(s) may also reside, or may be implemented, on a cloud infrastructure.

In one or many embodiment(s) described herein, the storage server(s) of any target storage (110A-110N) may be supported by a collection of one or more physical storage devices (not shown) on which various forms of digital information—e.g., any number of asset data and/or metadata copies (see e.g., FIG. 1E)—may be maintained. Each physical storage device may encompass non-transitory computer readable storage media on which said digital information may be stored in whole or in part, and temporarily or permanently. Further, the physical storage device(s) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Moreover, any target storage (110A-110N) is illustrated and described in further detail with respect to FIG. 1E, below.

In one or many embodiment(s) described herein, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the embodiments described herein.

Figure 1B:
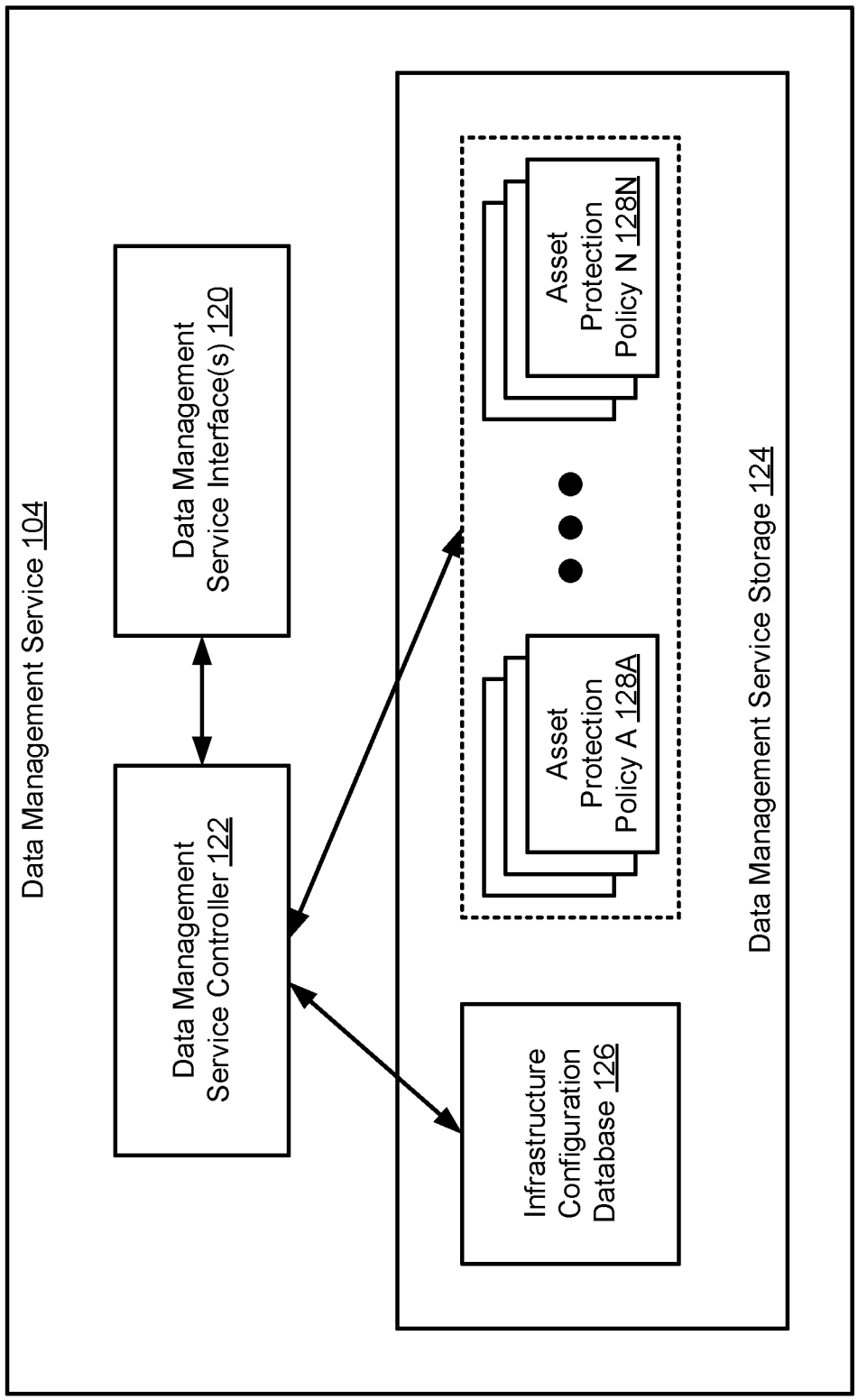
FIG. 1B shows a data management service in accordance with one or more embodiments described herein.

FIG. 1B shows a data management service in accordance with one or more embodiments described herein. The data management service (104) may include any number of data management service interfaces (120), a data management service controller (122), and data management service storage (124). Each of these data management service (104) components is described below.

In one or many embodiment(s) described herein, any data management service interface (120) may refer to networking hardware (e.g., a network card or adapter), a computer program implementing a logical interface (e.g., an application programming interface (API)) and executing on the underlying hardware of the data management service (104), an interactivity protocol, or any combination thereof, configured to enable or facilitate communications (or information exchange) between the data management service (104)

and other entities (e.g., any number of proxy nodes (see e.g., FIGS. 1A and 1C) and the admin device (see e.g., FIG. 1A)).

To that end, in one or many embodiment(s) described herein, any data management service interface (120) may include functionality to: obtain any number of configuration check requests, each specifying an asset source (see e.g., FIGS. 1A and 1D), an asset hosted on or accessible through the asset source, and a target storage (see e.g., FIGS. 1A and 1E), from the data management service controller (122); transmit the obtained configuration check request(s) to any number of proxy nodes; receive, from said proxy node(s), any number of configuration check responses regarding the transmitted configuration check request(s), where each configuration check response may include asset source configuration state, target storage configuration state, asset backup configuration state, and/or asset restore configuration state (all described below—see e.g., FIGS. 2A-6D); and provide the received configuration check response(s) to the data management service controller (122). One of ordinary skill, however, will appreciate that any data management service interface (120) may perform other functionalities without departing from the scope of the embodiments described herein.

In one or many embodiment(s) described herein, the data management service controller (122) may refer to instruction-processing hardware (e.g., any number of integrated circuits for processing computer readable instructions), a computer program executing on the underlying hardware of the data management service (104), or any combination thereof, configured to oversee and/or manage data management service (104) operations. To that end, the data management service controller (122) may include functionality to: generate and provide, to the data management service interface(s) (120) for transmission towards any number of proxy nodes (see e.g., FIGS. 1A and 1C), any number of configuration check requests each specifying an asset source (see e.g., FIGS. 1A and 1D), an asset hosted on or accessible through the asset source, and a target storage (see e.g., FIGS. 1A and 1E); obtain, from the data management service interface(s) (120), any number of configuration check responses, regarding the provided configuration check request(s), where each configuration check response may include asset source configuration state, target storage configuration state, asset backup configuration state, and/or asset restore configuration state (all described below—see e.g., FIGS. 2A-6D); update the infrastructure configuration database (described below) based at least in part on the obtained configuration check response(s); and create and/or adjust any number of asset protection policies (described below) directed to protecting asset data and/or metadata pertaining to any number of assets. One of ordinary skill, however, will appreciate that the data management service controller (122) may perform other functionalities without departing from the scope of the embodiments described herein.

In one or many embodiment(s) described herein, the data management service storage (124) may refer to a collection of one or more physical storage devices (not shown) on which various forms of digital information—e.g., an infrastructure configuration database (126) (described below) and any number of asset protection policies (128A-128N) (described below)—may be maintained. Each physical storage device may encompass non-transitory computer readable storage media on which said digital information may be stored in whole or in part, and temporarily or permanently. Further, the data management service storage (124) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) described herein, the infrastructure configuration database (126) may refer to a dedicated data repository configured to maintain any number of infrastructure configuration database entries (not shown). Each infrastructure configuration database entry, in turn, may store current configuration state respective to an asset source (see e.g., FIG. 1D), an asset (also see e.g., FIG. 1D), or a target storage (sec e.g., FIG. 1E). Should an infrastructure configuration database entry pertain to an asset source, the infrastructure configuration database entry may store asset source configuration state (described further below—see e.g., FIGS. 2A and 2B) respective to the asset source. Meanwhile, should an infrastructure configuration database entry pertain to an asset, the infrastructure configuration database entry may at least store asset backup configuration state, with the option of additionally storing asset restore configuration state (both described further below—see e.g., FIGS. 2A and 2B), respective to the asset. On the other hand, should an infrastructure configuration database entry pertain to a target storage, the infrastructure configuration database entry may store target storage configuration state (described further below—see e.g., FIGS. 2A and 2B) respective to the target storage.

Figure 1C:
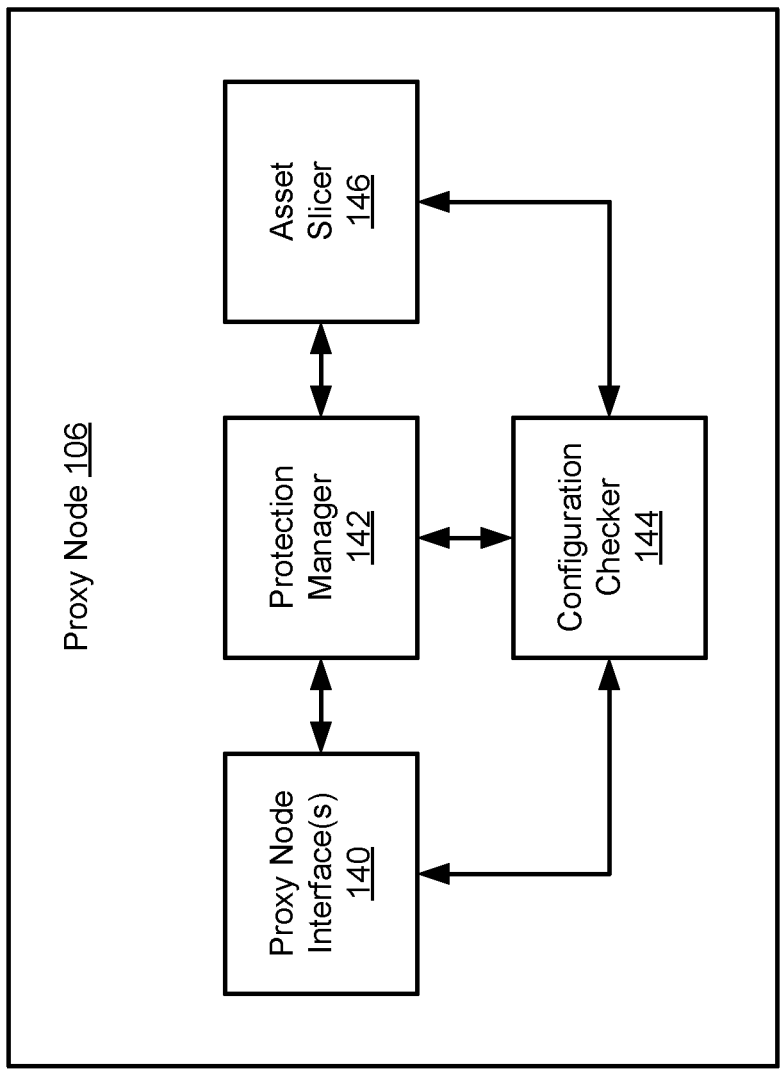
FIG. 1C shows a proxy node in accordance with one or more embodiments described herein.
Figure 1D:
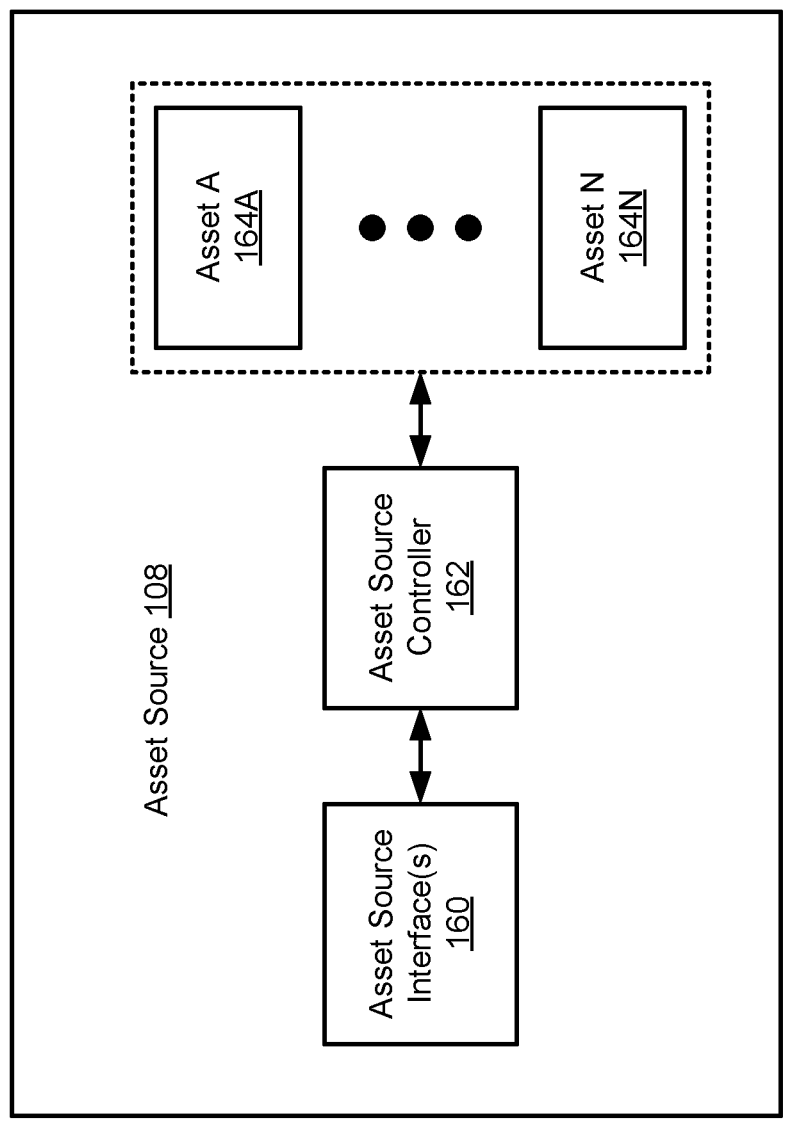
FIG. 1D shows an asset source in accordance with one or more embodiments described herein.

In one or many embodiment(s) described herein, any asset protection policy (128A-128N) may refer to a set of rules and procedures outlining a strategy for protecting (e.g., via any number of backup operations) data and/or metadata maintained on any given asset (see e.g., FIG. 1D). The set of rules and procedures may, for example, dictate: which asset data and/or metadata maintained on the given asset should be protected; on which asset source (see e.g., FIGS. 1A and 1D) is the given asset hosted or through which asset source is the given asset accessible; where (e.g., one or more target storages) should backup copies (e.g., asset data and/or metadata copies (see e.g., FIG. 1E)) of any protected asset data and/or metadata be stored; how often should a backup operation centered about the given asset transpire; and how long should any backup copies of any protected asset data and/or metadata be retained. Said set of rules and procedures are not limited to the aforementioned specific examples.

While FIG. 1B shows a configuration of components and/or subcomponents, other data management service (104) configurations may be used without departing from the scope of the embodiments described herein FIG. 1C shows a proxy node in accordance with one or more embodiments described herein. The proxy node (106) may include any number of proxy node interfaces (140), a protection manager (142), a configuration checker (144), and an asset slicer (146). Each of these proxy node (106) components is described below.

In one or many embodiment(s) described herein, any proxy node interface (140) may refer to networking hardware (e.g., a network card or adapter), a computer program implementing a logical interface (e.g., an application programming interface (API)) and executing on the underlying hardware of the proxy node (106), an interactivity protocol, or any combination thereof, configured to enable or facilitate communications (or information exchange) between the proxy node (106) and other entities (e.g., the data management service (see e.g., FIGS. 1A and 1B), any number of asset sources (see e.g., FIGS. 1A and 1D), and any number of target storages (see e.g., FIGS. 1A and 1E)).

To that end, in one or many embodiment(s) described herein, any proxy node interface (140) may include functionality to: receive any number of configuration check requests, each specifying an asset source (see e.g., FIGS. 1A and 1D), an asset hosted on or accessible through the asset source, and a target storage (see e.g., FIGS. 1A and 1E), from the data management service (see e.g., FIGS. 1A and 1B); provide the received configuration check request(s) to the protection manager (142) for processing; obtain, from the protection manager (142), any number of configuration check responses regarding the provided configuration check request(s), where each configuration check response may include asset source configuration state, target storage configuration state, asset backup configuration state, and/or asset restore configuration state (all described below—see e.g., FIGS. 2A-6D); transmit the obtained configuration check response(s) to the data management service; and attempt to (and thus successfully or unsuccessfully) establish any number of connections, on behalf of the configuration checker (144), to any number of asset sources and/or any number of target storages. One of ordinary skill, however, will appreciate that any proxy node interface (140) may perform other functionalities without departing from the scope of the embodiments described herein.

In one or many embodiment(s) described herein, the protection manager (142) may refer to instruction-processing hardware (e.g., any number of integrated circuits for processing computer readable instructions), a computer program executing on the underlying hardware of the proxy node (106), or any combination thereof, configured to oversee and/or manage backup and restore operations targeting any granularity of asset data and/or metadata of any number of assets across any number of asset sources (see e.g., FIGS. 1A and 1D). To that end, the protection manager (142) may include functionality to: obtain any number of configuration check requests, each specifying an asset source, an asset hosted on or accessible through the asset source, and a target storage (see e.g., FIGS. 1A and 1E), from the proxy node interface(s) (140); for any given obtained configuration check request, instruct or invoke the configuration checker (144) to perform one or more of: (i) an asset source configuration check, respective to the specified asset source, to obtain asset source configuration state; (ii) a target storage configuration check, respective to the specified target storage, to obtain target storage configuration state; (iii) an asset backup configuration check, respective to the specified asset, to obtain asset backup configuration state; and (iv) an asset restore configuration check, respective to the specified asset, to obtain asset restore configuration state; perform any number of genuine and/or simulated backup operations, as well as instruct or invoke the asset slicer (146) to partition asset snapshot data, in order to assist the configuration checker (144) in the performance of any asset backup configuration check(s); perform any number of genuine restore operations, as well as instruct or invoke the asset slicer (146) to partition asset snapshot data, in order to assist the configuration checker (144) in the performance of any asset restore configuration check(s); generate, using any obtained asset source configuration state, target storage configuration state, asset backup configuration state, and/or asset restore configuration state, a configuration check response for any given obtained configuration check request; and provide any generated configuration check response(s) to the proxy node interface(s) (140) for transmission towards the data management service (see e.g., FIGS. 1A and 1B).

One of ordinary skill, however, will appreciate that the protection manager (142) may perform other functionalities without departing from the scope of the embodiments described herein.

In one or many embodiment(s) described herein, the configuration checker (144) may refer to instruction-processing hardware (e.g., any number of integrated circuits for processing computer readable instructions), a computer program executing on the underlying hardware of the proxy node (106), or any combination thereof, configured to perform one or more configuration checks directed to ascertaining a current viability of the asset protection infrastructure (i.e., the system—see e.g., FIG. 1A) (or at least a subset thereof) to enable/support asset data and/or metadata protection (e.g., via any number of backup and/or restore operations). To that end, the configuration checker (144) may include functionality to: in response to instructions from or an invocation by the protection manager (142)—perform one or more of the following: (i) an asset source configuration check (see e.g., FIGS. 3A and 3B) involving an asset source, to obtain asset source configuration state; (ii) a target storage configuration check (see e.g., FIGS. 4A and 4B) involving a target storage, to obtain target storage configuration state; (iii) an asset backup configuration check (see e.g., FIGS. 5A-5F) involving an asset, to obtain asset backup configuration state; and (iv) an asset restore configuration check (see e.g., FIGS. 6A-6D) involving an/the asset, to obtain asset restore configuration state; and provide, to the protection manager (142), any obtained asset source configuration state, target storage configuration state, asset backup configuration state, and/or asset restore configuration state. One of ordinary skill, however, will appreciate that the configuration checker (144) may perform other functionalities without departing from the scope of the embodiments described herein.

In one or many embodiment(s) described herein, the asset slicer (146) may refer to instruction-processing hardware (e.g., any number of integrated circuits for processing computer readable instructions), a computer program executing on the underlying hardware of the proxy node (106), or any combination thereof, configured to partition or slice any asset snapshot data of any asset snapshot(s), of any number of assets (see e.g., FIG. 1D), which may have been, or may be, successfully mounted on the proxy node (106). To that end, the asset slicer (146) may include functionality to create multiple asset snapshot data slices from any given asset snapshot data. One of ordinary skill, however, will appreciate that the asset slicer (146) may perform other functionalities without departing from the scope of the embodiments described herein.

While FIG. 1C shows a configuration of components and/or subcomponents, other proxy node (106) configurations may be used without departing from the scope of the embodiments described herein.

FIG. 1D shows an asset source in accordance with one or more embodiments described herein. The asset source (108) may include any number of asset source interfaces (160), an asset source controller (162), and any number of assets (164A-164N). Each of these asset source (108) components is described below.

In one or many embodiment(s) described herein, any asset source interface (160) may refer to networking hardware (e.g., a network card or adapter), a computer program implementing a logical interface (e.g., an application programming interface (API)) and executing on the underlying hardware of the asset source (108), an interactivity protocol, or any combination thereof, configured to enable or facilitate communications (or information exchange) between the asset source (108) and other entities (e.g., any number of proxy nodes (see e.g., FIGS. 1A and 1C)).

To that end, in one or many embodiment(s) described herein, any asset source interface (160) may include functionality to: receive, from the proxy node(s), any number of requests directed to the attempted creation of any number of asset snapshots of the asset(s) (164A-164N); provide said request(s) to the asset source controller (162) for processing; obtain, from the asset source controller (162), any number of asset snapshot creation error logs should the attempted creation of any asset snapshots of the asset(s) (164A-164N) result in failure; transmit the obtained asset snapshot creation error log(s) to the proxy node(s); obtain, from the asset source controller (162), any asset snapshots should the attempted creation of the asset snapshot(s) of the asset(s) (164A-164N) result in success; and transmit the obtained asset snapshot(s) to the proxy node(s). One of ordinary skill, however, will appreciate that any asset source interface (160) may perform other functionalities without departing from the scope of the embodiments described herein.

In one or many embodiment(s) described herein, the asset source controller (162) may refer to instruction-processing hardware (e.g., any number of integrated circuits for processing computer readable instructions), a computer program executing on the underlying hardware of the asset source (108), or any combination thereof, configured to oversee and/or manage asset source (108) operations. To that end, the asset source controller (162) may include functionality to: obtain, from the asset source interface(s) (160), any number of requests directed to the attempted creation of any number of asset snapshots of the asset(s) (164A-164N); based on said obtained request(s), attempt to create the asset snapshot(s) of the asset(s) (164A-164N) through any number of existing snapshot creation procedures; should the attempt(s) at creating the asset snapshot(s) result in success, provide the created asset snapshot(s) to the asset source interface(s) (160) for transmission to the proxy node(s) (see e.g., FIGS. 1A and 1C); alternatively, should the attempt(s) at creating the asset snapshot(s) result in failure, identify any number of asset snapshot creation error logs capturing any error conditions and/or events respective to, or that transpired during, the asset snapshot creation attempt(s); and provide the identified asset snapshot creation error log(s) to the asset source interface(s) (160) for transmission to the proxy node(s). One of ordinary skill, however, will appreciate that any asset source controller (162) may perform other functionalities without departing from the scope of the embodiments described herein.

In one or many embodiment(s) described herein, any asset (164A-164N) may refer to any physical or logical construct configured to access and/or maintain enterprise information (e.g., data, metadata, and/or state). Said enterprise information may, for example, be pertinent to enterprise operations and/or services. Further, said enterprise information, on any asset (164A-164N), may be organized and accessible through one or more file system implementations (e.g., disk file system(s), distributed file system(s), etc.). Examples of any asset (164A-164N) may include local storage, network attached storage (NAS) shares, virtual machines, and database applications. Any asset (164A-164N), moreover, is not limited to the aforementioned specific examples.

While FIG. 1D shows a configuration of components and/or subcomponents, other asset source (108) configurations may be used without departing from the scope of the embodiments described herein.

Figure 1E:
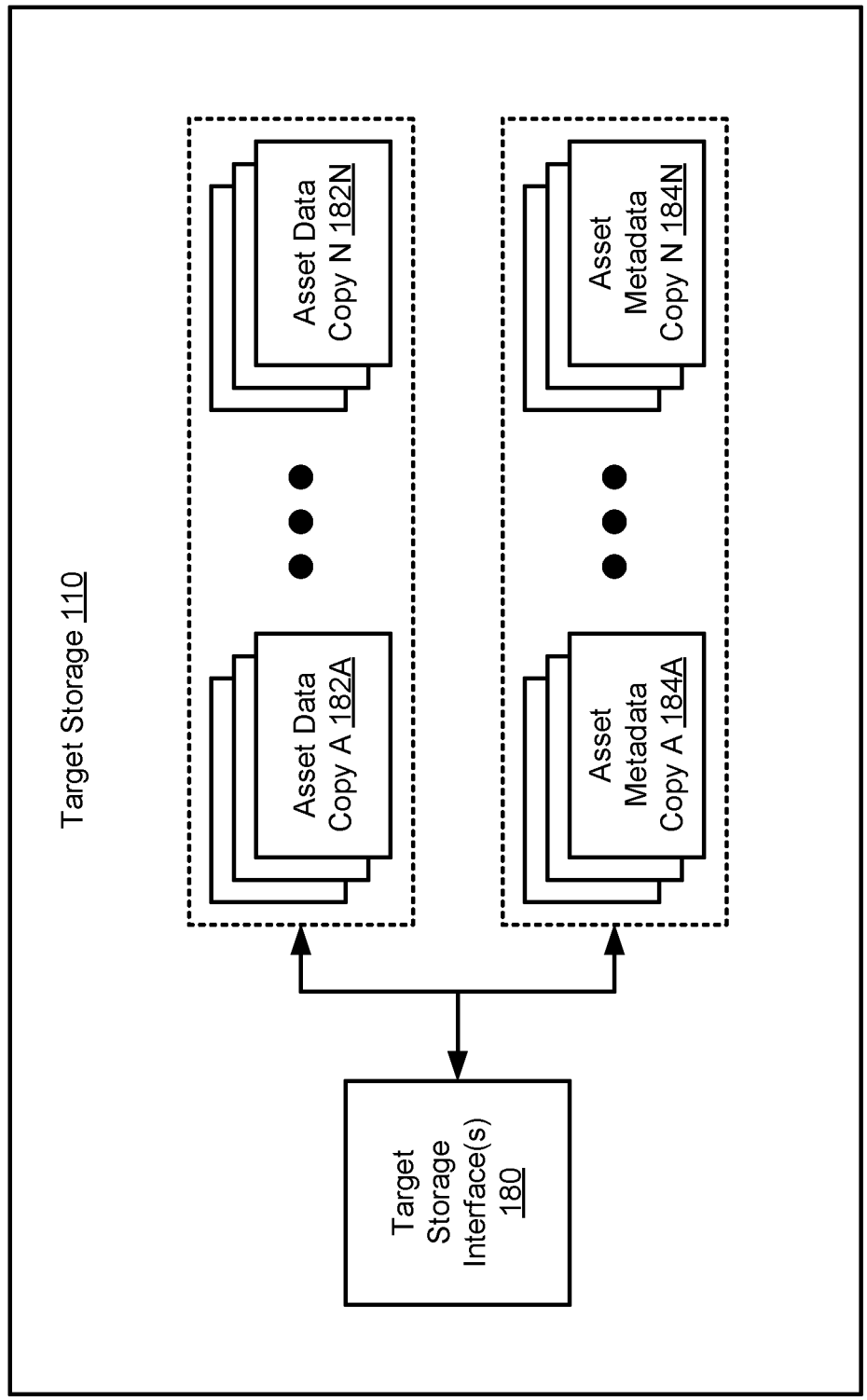
FIG. 1E shows a target storage in accordance with one or more embodiments described herein.

FIG. 1E shows a target storage in accordance with one or more embodiments described herein. The target storage (110) may include any number of target storage interfaces (180), any number of asset data copies (182A-182N), and any number of asset metadata copies (184A-184N). Each of these target storage (110) components is described below.

In one or many embodiment(s) described herein, any target storage interface (180) may refer to networking hardware (e.g., a network card or adapter), a computer program implementing a logical interface (e.g., an application programming interface (API)) and executing on the underlying hardware of the target storage (110), an interactivity protocol, or any combination thereof, configured to enable or facilitate communications (or information exchange) between the target storage (110) and other entities (e.g., any number of proxy nodes (see e.g., FIGS. 1A and 1C)).

To that end, in one or many embodiment(s) described herein, any target storage interface (180) may include functionality to: receive, from the proxy node(s), any number of write requests including any asset data copy (182A-182N) and/or any asset metadata copy (184A-184N) (both described below) for any number of assets (see e.g., FIG. 1D) involved in any number of genuine backup operations conducted during any number of asset backup configuration checks (see e.g., FIGS. 2A, 2B, and 5A-5F); store the received asset data copy/copies (182A-182N) and/or asset metadata copy/copies (184A-184N) in response to the received write request(s); receive, from the proxy node(s), any number of read requests specifying any asset data copy (182A-182N) and/or any asset metadata copy (184A-184N) for any number of assets involved in any number of genuine restore operations conducted during any number of asset restore configuration checks (see e.g., FIGS. 2A, 2B, and 6A-6D); and transmit said specified asset data copy/copies (182A-182N) and/or asset metadata copy/copies (184A-184N) to the proxy node(s) in response to the received read request(s). One of ordinary skill will appreciate that any target storage interface (180) may perform other functionalities without departing from the scope of the embodiments described herein.

In one or many embodiment(s) described herein, any asset data copy (182A-182N) may refer to a backup copy of any number of file system objects (e.g., directories and/or files) belonging to an asset (see e.g., FIG. 1D). The file system object(s), in turn, may store the asset data, or any granularity thereof, maintained on/by the asset.

In one or many embodiment(s) described herein, any asset metadata copy (184A-184N) may refer to a backup copy of any information descriptive of a corresponding asset data copy (182A-182N), where the asset metadata copy (184A-184N) also belongs to an asset to which the corresponding asset data copy (182A-182N) belongs.

While FIG. 1E shows a configuration of components and/or subcomponents, other target storage (110) configurations may be used without departing from the scope of the embodiments described herein.

FIGS. 2A and 2B show flowcharts describing a method for configuration checking of asset protection infrastructure in accordance with one or more embodiments described herein. The various steps outlined below may be performed by any proxy node (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 2A, in Step 200, a configuration check request is received from the data management service (see e.g., FIGS. 1A and 1B). In one or many embodiment(s) described herein, the configuration check request may be directed to ascertaining a current viability of the asset protection infrastructure (i.e., the system—see e.g., FIG. 1A) (or at least a subset thereof) to enable/support asset data and/or metadata protection (e.g., via any number of backup and/or restore operations). Further, the configuration check request may include or specify an asset source (see e.g., FIGS. 1A and 1D), an asset hosted on or accessible through the asset source, and a target storage (see e.g., FIGS. 1A and 1E).

In Step 202, an asset source configuration check is performed. In one or many embodiment(s) described herein, the asset source configuration check may refer to a procedure directed to ascertaining a current viability of the asset source (specified in the configuration check request received in Step 200) to enable/support the protection of any asset data and/or metadata at least of the asset (also specified in the configuration check request). Said procedure is illustrated and described in further detail with respect to FIGS. 3A and 3B, below.

Moreover, in one or many embodiment(s) described herein, upon completing the asset source configuration check, an asset source configuration state, respective to the asset source, may be obtained. The asset source configuration state may refer to information that collectively summarizes said current viability of the said specified asset source towards enabling/supporting the protection of any enterprise information (e.g., asset data and/or metadata) stored on/by said specified asset. To that end, the asset source configuration state may include or specify an asset source connection attempt result indicating a result (e.g., a failure or a success) obtained through an attempted connection establishment with the specified asset source. Optionally, the asset source configuration state may additionally include or specify: identification metadata respective to any number of discovered asset source network interfaces of the specified asset source; any number of asset source network interface performance metrics collected for the discovered asset source network interface(s); and a preferred asset source network interface identified from the discovered asset source network interface(s) and based on the collected asset source network interface performance metric(s).

In Step 204, a target storage configuration check is performed. In one or many embodiment(s) described herein, the target storage configuration check may refer to a procedure directed to ascertaining a current viability of the target storage (specified in the configuration check request received in Step 200) to enable/support the protection of any asset data and/or metadata at least maintained on the asset (also specified in the configuration check request). Said procedure is illustrated and described in further detail with respect to FIGS. 4A and 4B, below.

Moreover, in one or many embodiment(s) described herein, upon completing the target storage configuration check, a target storage configuration state, respective to the target storage, may be obtained. The target storage configuration state may refer to information that collectively summarizes said current viability of the said specified target storage towards enabling/supporting the protection of any enterprise information (e.g., asset data and/or metadata) stored on/by said specified asset. To that end, the target storage configuration state may include or specify target storage connection attempt result indicating a result (e.g., a failure or a success) obtained through an attempted connection establishment with the specified target storage. Optionally, the target storage configuration state may additionally include or specify: identification metadata respective to any number of discovered target storage network interfaces of the specified target storage; any number of target storage network interface performance metrics collected for the discovered target storage network interface(s); and a preferred target storage network interface identified from the discovered target storage network interface(s) and based on the collected target storage network interface performance metric(s).

In Step 206, an asset source connection attempt result is obtained. More specifically, in one or many embodiment(s) described herein, the asset source connection attempt result may be extracted from the asset source configuration state (obtained in Step 202). Further, the asset source connection attempt result may refer to a piece of information reflective of the result (e.g., a failure or a success) obtained through the attempted connection establishment with the asset source (specified in the configuration check request received in Step 200).

In Step 208, a target storage connection attempt result is obtained. More specifically, in one or many embodiment(s) described herein, the target storage connection attempt result may be extracted from the target storage configuration state (obtained in Step 204). Further, the target storage connection attempt result may refer to a piece of information reflective of the result (e.g., a failure or a success) obtained through the attempted connection establishment with the target storage (specified in the configuration check request received in Step 200).

In Step 210, a determination is made as to whether the asset source connection attempt result (obtained in Step 206) and the target storage connection attempt result (obtained in Step 208) are both reflected as successes. In one or many embodiment(s) described herein, if it is determined that at least one of the asset source and/or target storage connection attempt result(s) is/are reflected as a failure, then the method proceeds to Step 212. On the other hand, in one or many other embodiment(s) described herein, if it is alternatively determined that both the asset source and target storage connection attempt results are reflected as successes, then the method alternatively proceeds to Step 220 (see e.g., FIG. 2B).

In Step 212, following the determination (made in Step 210) that at least one of the asset source connection attempt result (obtained in Step 206) and/or the target storage connection attempt result (obtained in Step 208) is/are reflected as a failure, a configuration check response is generated. In one or many embodiment(s) described herein, the configuration check response may include or specify: the asset source configuration state (obtained in Step 202); and the target storage configuration state (obtained in Step 204).

In Step 214, the configuration check response (generated in Step 214) is provided, or otherwise transmitted, to the data management service in reply to the configuration check request received therefrom (in Step 200).

Turning to FIG. 2B, in Step 220, following the alternate determination (made in Step 210) that the asset source connection attempt result (obtained in Step 206) and/or the target storage connection attempt result (obtained in Step 208) are both reflected as successes, an asset backup configuration check is performed. In one or many embodiment(s) described herein, the asset backup configuration check may refer to a procedure directed to ascertaining a current viability of any asset data and/or metadata, of the asset (specified in the configuration check request received in Step 200), to undergo a backup operation contingent on the asset source and the target storage (also specified in the configuration check request). Said procedure is illustrated and described in further detail with respect to FIGS. 5A-5F, below.

Moreover, in one or many embodiment(s) described herein, upon completing the asset backup configuration check, an asset backup configuration state, respective to the asset, may be obtained. The asset backup configuration state may refer to information that collectively summarizes said current viability of any enterprise information (e.g., asset data and/or metadata), stored on/by the said specified asset, towards undergoing any backup operation(s) that, at least in part, enable/support the protection of said enterprise information. To that end, the asset backup configuration state may include or specify an asset source connection attempt result indicating a result (e.g., a failure or a success) obtained through an attempted connection establishment with the specified asset source. Optionally, the asset backup configuration state may additionally include or specify one or more of the following: an asset snapshot creation error log indicating any number of error conditions and/or events respective to, or that transpired during, an attempt to create an asset snapshot of said specified asset; an asset snapshot mount error log indicating any number of error conditions and/or events respective to, or that transpired during, an attempt to mount an asset snapshot of said specified asset; a target storage connection attempt result indicating a result (e.g., a failure or a success) obtained through an attempted connection establishment with the specified target storage; a backup operation attempt result indicating a result (e.g., a failure or a success) obtained through an attempted genuine backup operation involving asset snapshot data of an asset snapshot of said specified asset; a backup operation error log indicating any number of error conditions and/or events respective to, or that transpired during, an attempt to perform said genuine backup operation; any number of genuine backup operation input-output (IO) performance metrics collected for a successfully performed genuine backup operation; a backup identifier (ID) uniquely identifying said successfully performed genuine backup operation and associated with an asset data copy of said specified asset on the specified target storage following completion of said successfully performed genuine backup operation; and any number of simulated backup operation IO performance metrics collected for an executed simulated backup operation involving asset snapshot data of an asset snapshot of said specified asset.

In Step 222, the asset backup configuration state (obtained in Step 220) is searched. More specifically, in one or many embodiment(s) described herein, a backup ID may be searched for within the asset backup configuration state.

In Step 224, a determination is made as to whether a backup ID (searched for in Step 222) had been found within the asset backup configuration state (obtained in Step 220). In one or many embodiment(s) described herein, if it is determined that the asset backup configuration state excludes the backup ID, then the method proceeds to Step 226. On the other hand, in one or many other embodiment(s) described herein, if it is alternatively determined that the asset backup configuration state includes the backup ID, then the method alternatively proceeds to Step 230.

In Step 226, following the determination (made in Step 224) that the asset backup configuration state (obtained in Step 220) excludes the backup ID (searched for there-within in Step 222), a configuration check response is generated. In one or many embodiment(s) described herein, the configuration check response may include or specify: the asset source configuration state (obtained in Step 202); the target storage configuration state (obtained in Step 204); and the asset backup configuration state.

In Step 228, the configuration check response (generated in Step 226) is provided, or otherwise transmitted, to the data management service in reply to the configuration check request received therefrom (in Step 200).

In Step 230, following the alternate determination (made in Step 224) that the asset backup configuration state (obtained in Step 220) includes the backup ID (searched for there-within in Step 222), an asset restore configuration check is performed. In one or many embodiment(s) described herein, the asset restore configuration check may refer to a procedure directed to ascertaining a current viability of any asset data and/or metadata, of the asset (specified in the configuration check request received in Step 200), to undergo a restore operation contingent on the asset source and the target storage (also specified in the configuration check request). Said procedure is illustrated and described in further detail with respect to FIGS. 6A-6D, below.

Moreover, in one or many embodiment(s) described herein, upon completing the asset restore configuration check, an asset restore configuration state, respective to the asset, may be obtained. The asset restore configuration state may refer to information that collectively summarizes said current viability of any enterprise information (e.g., asset data and/or metadata), stored on/by the said specified asset, towards undergoing any restore operation(s) that, at least in part, enable/support the protection of said enterprise information. To that end, the asset restore configuration state may include or specify an asset source connection attempt result indicating a result (e.g., a failure or a success) obtained through an attempted connection establishment with the specified asset source. Optionally, the asset restore configuration state may additionally include or specify one or more of the following: a new asset snapshot creation error log indicating any number of error conditions and/or events respective to, or that transpired during, an attempt to create a new asset snapshot of said specified asset; a new asset snapshot mount error log indicating any number of error conditions and/or events respective to, or that transpired during, an attempt to mount a new asset snapshot of said specified asset; a target storage connection attempt result indicating a result (e.g., a failure or a success) obtained through an attempted connection establishment with the specified target storage; a restore operation attempt result indicating a result (e.g., a failure or a success) obtained through an attempted genuine restore operation involving asset snapshot data of an asset snapshot of said specified asset; a restore operation error log indicating any number of error conditions and/or events respective to, or that transpired during, an attempt to perform said genuine restore operation; and any number of genuine restore operation input-output (IO) performance metrics collected for a successfully performed genuine restore operation.

In Step 232, a configuration check response is generated. In one or many embodiment(s) described herein, the configuration check response may include or specify: the asset source configuration state (obtained in Step 202); the target storage configuration state (obtained in Step 204); the asset backup configuration state (obtained in Step 220); and the asset restore configuration state (obtained in Step 230).

In Step 234, the configuration check response (generated in Step 232) is provided, or otherwise transmitted, to the data management service in reply to the configuration check request received therefrom (in Step 200).

Figure 3A:
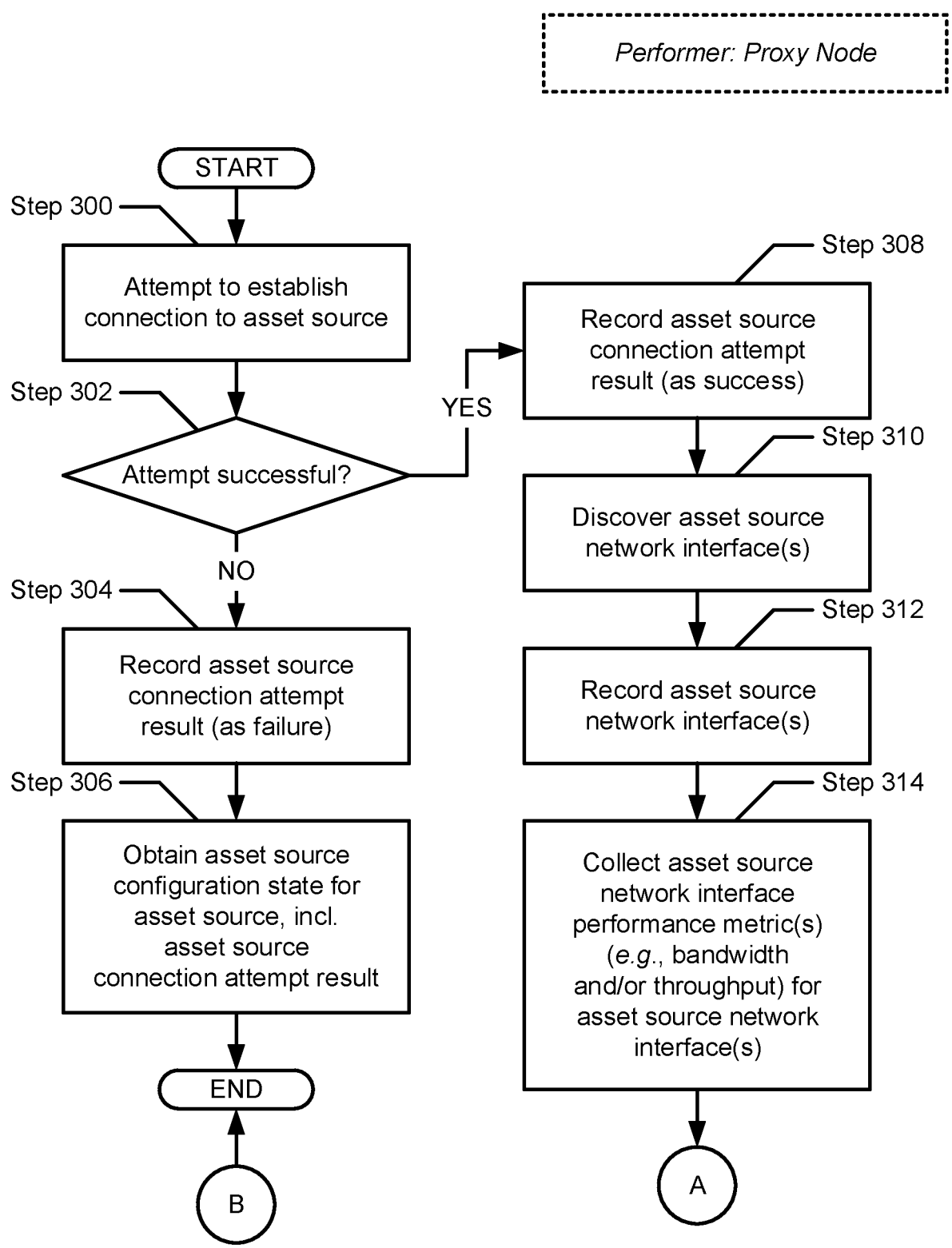
FIGS. 3A and 3B show flowcharts describing a method for asset source configuration checking in accordance with one or more embodiments described herein.
Figure 3B:
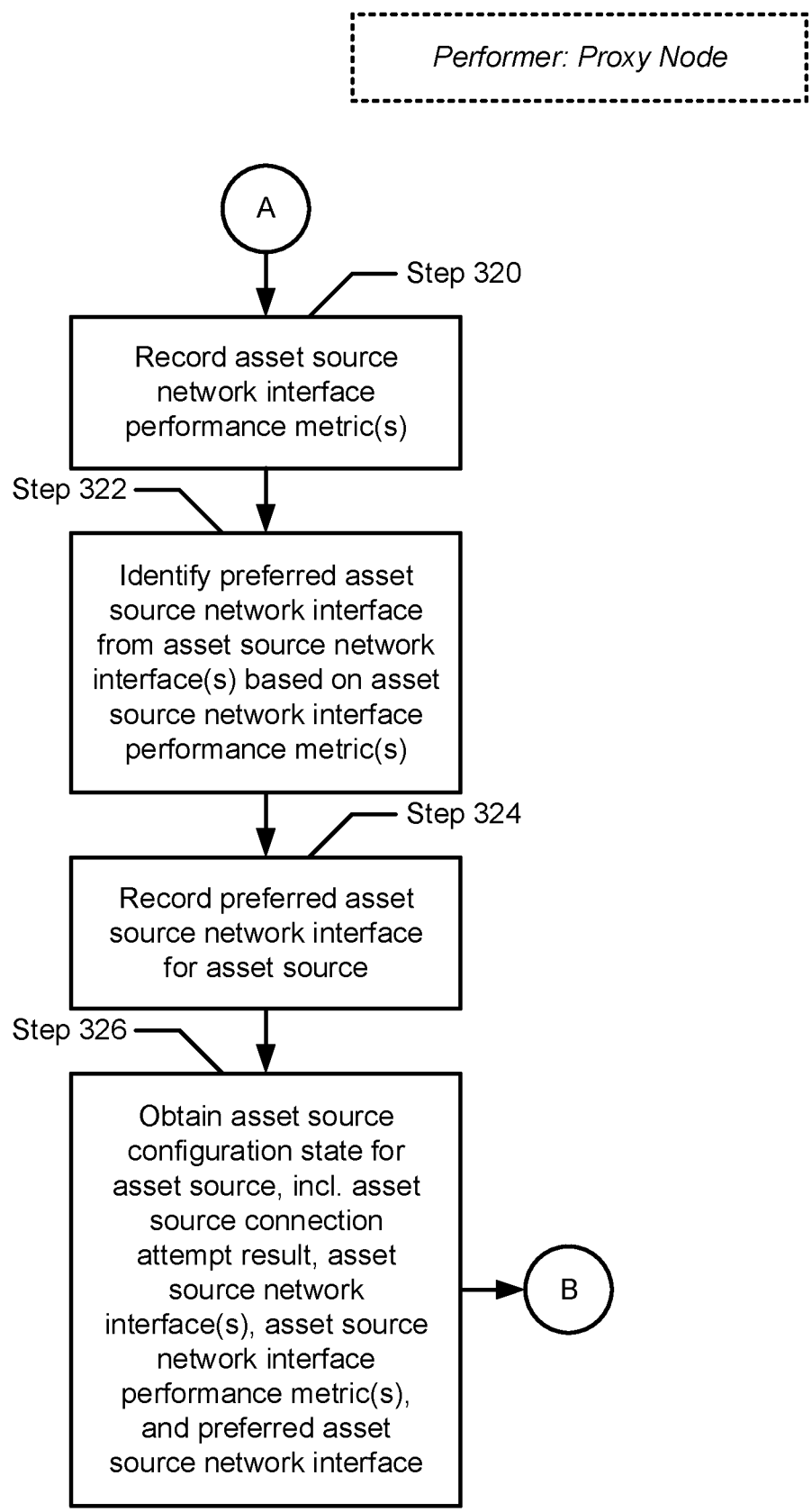

FIGS. 3A and 3B show flowcharts describing a method for asset source configuration checking in accordance with one or more embodiments described herein. The various steps outlined below may be performed by any proxy node (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, establishment of a connection to an asset source is attempted. In one or many embodiment(s) described herein, the asset source (see e.g., FIGS. 1A and 1D) may have been specified in a configuration check request (see e.g., FIGS. 2A and 2B) received from the data management service (see e.g., FIGS. 1A and 1B). Further, the connection establishment attempt may, for example, be facilitated using a management network (e.g., various applications, tools, processes, etc. directed to provisioning, operating, maintaining, administrating, and/or securing any granularity of the asset protection infrastructure—i.e., the system (see e.g., FIG. 1A)).

In Step 302, a determination is made as to whether establishment of a connection (attempted in Step 300) to the asset source succeeded. In one or many embodiment(s) described herein, if it is determined that said connection attempt failed, then the method proceeds to Step 304. On the other hand, in one or many other embodiment(s) described herein, if it is alternatively determined that said connection attempt succeeded, then the method alternatively proceeds to Step 308.

In Step 304, following the determination (made in Step 302) that establishment of a connection (attempted in Step 300) to the asset source failed, an asset source connection attempt result is recorded. In one or many embodiment(s) described herein, the asset source connection attempt result may refer to a piece of information reflective of the result obtained through the attempted connection establishment with the asset source. Further, the asset source connection attempt result may reflect said result as a failure.

In Step 306, an asset source configuration state, respective to the asset source, is obtained. In one or many embodiment(s) described herein, the asset source configuration state may refer to information that collectively summarizes said current viability of the said specified asset source towards enabling/supporting the protection of any enterprise information (e.g., asset data and/or metadata) stored on/by said specified asset. Further, the asset source configuration state may include or specify the asset source connection attempt result (recorded in Step 304).

In Step 308, following the alternate determination (made in Step 302) that establishment of a connection (attempted in Step 300) to the asset source succeeded, an asset source connection attempt result is recorded. In one or many embodiment(s) described herein, the asset source connection attempt result may refer to a piece of information reflective of the result obtained through the attempted connection establishment with the asset source. Further, the asset source connection attempt result may reflect said result as a success.

In Step 310, any number of asset source network interfaces is/are is discovered. In one or many embodiment(s) described herein, any asset source network interface may refer to networking hardware (e.g., a network card or adapter), a computer program implementing a logical interface (e.g., an application programming interface (API)) and executing on the underlying hardware of the asset source, an interactivity protocol, or any combination thereof, configured to enable or facilitate communications (or information exchange) between the asset source and other entities (e.g., the proxy node performing the instant method). Further, any number of existing network interface discovery techniques may be used to discover the asset source network interface (s).

In Step 312, the asset source network interface(s) (discovered in Step 310) (or more specifically, identification metadata descriptive thereof) is/are recorded. In one or many embodiment(s) described herein, said recorded identification metadata for any given asset source network interface may include, but may not be limited to: a network interface name (e.g., 'eth0' for a first Ethernet interface, 'lo' for a loopback interface, 'wlan0' for a first wireless network interface, etc.) assigned to or associated with the given asset source network interface; and a network layer (e.g., Internet Protocol (IP)) address assigned to or associated with the given asset source network interface. Further, said recorded identification metadata, for any given asset source network interface, is not limited to the aforementioned specific examples.

In Step 314, any number of asset source network interface performance metrics, for each of the asset source network interface(s) (discovered in Step 310), is/are collected. In one or many embodiment(s) described herein, any asset source network interface performance metric may refer to a measurable parameter reflecting a qualitative or quantitative assessment of the network performance exhibited by a given asset source network interface. Examples of said asset source network interface performance metric(s), for a given asset source network interface, may include: a bandwidth—i.e., a maximum (theoretical) amount or capacity of data/information (e.g., typically expressed in bits or bytes per second) that can be received and/or transmitted through the given asset source network interface; and a throughput—i.e., a maximum (empirical) amount or capacity of data/information (e.g., typically expressed in bits or bytes per second) that has been received and/or transmitted through the given asset source network interface. Further, said asset source network interface performance metric(s), for any given asset source network interface, is/are not limited to the aforementioned specific examples.

Hereinafter, following Step 314, the method proceeds to Step 320 (see e.g., FIG. 3B).

Turning to FIG. 3B, in Step 320, the asset source network interface performance metric(s) (collected in Step 314), for each of the asset source network interface(s) (discovered in Step 310), is/are recorded.

In Step 322, a preferred asset source network interface is identified. In one or many embodiment(s) described herein, the preferred asset source network interface may be identified from the asset source network interface(s) (discovered in Step 310) and based on the asset source network interface metric(s) (collected in Step 314). The preferred asset source network interface, for example, may be identified as the asset source network interface, of the asset source network interface(s), that exhibits the best asset source network interface metric(s) (e.g., a highest bandwidth and/or throughput). The preferred asset source network interface, accordingly, may refer to an asset source network interface that exhibits the best or optimal network performance.

In Step 324, the preferred asset source network interface (identified in Step 322) is recorded.

In Step 326, an asset source configuration state, respective to the asset source, is obtained. In one or many embodiment(s) described herein, the asset source configuration state may refer to information that collectively summarizes said current viability of the said specified asset source towards enabling/supporting the protection of any enterprise information (e.g., asset data and/or metadata) stored on/by said specified asset. Further, the asset source configuration state may include or specify: the asset source connection attempt result (recorded in Step 308); the identification metadata for each of discovered asset source network interface(s) (recorded in Step 312); the asset source network interface performance metric(s) for each of the discovered asset source network interface(s) (recorded in Step 320); and the preferred asset source network interface (recorded in Step 324).

Figure 4A:
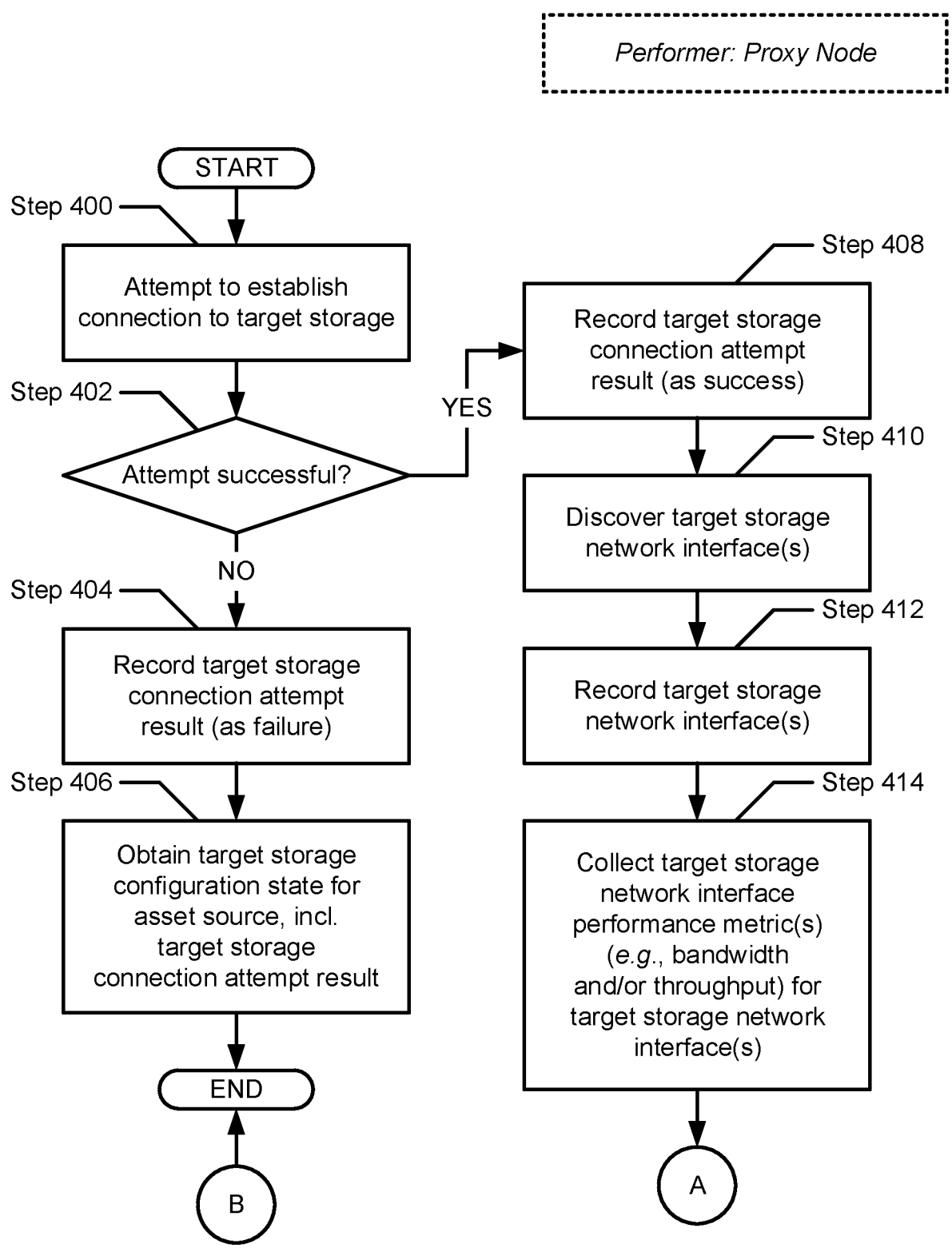
FIGS. 4A and 4B show flowcharts describing a method for target storage configuration checking in accordance with one or more embodiments described herein.
Figure 4B:
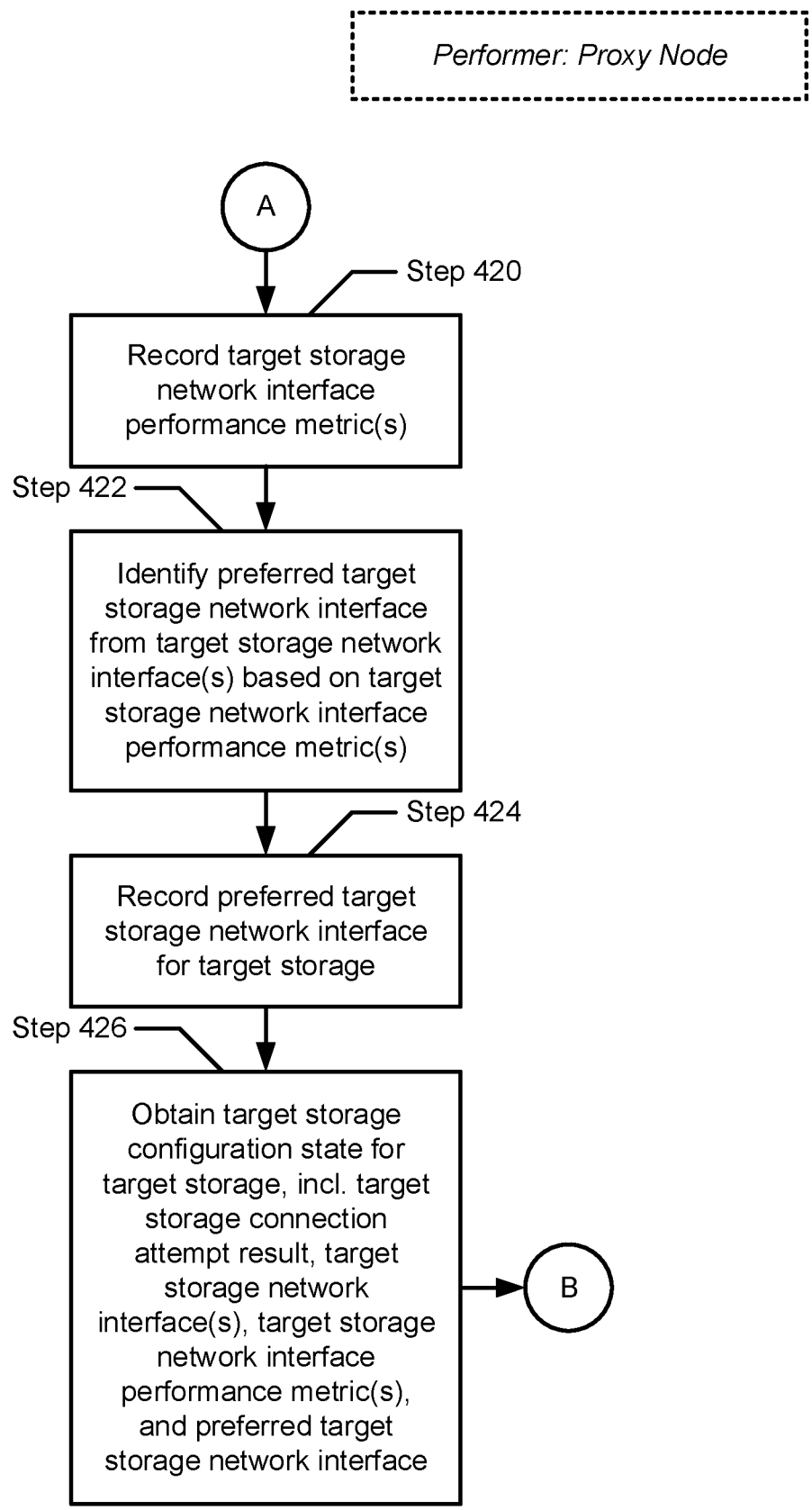

FIGS. 4A and 4B show flowcharts describing a method for target storage configuration checking in accordance with one or more embodiments described herein. The various steps outlined below may be performed by any proxy node (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, establishment of a connection to target storage is attempted. In one or many embodiment(s) described herein, the target storage (see e.g., FIGS. 1A and 1E) may have been specified in a configuration check request (see e.g., FIGS. 2A and 2B) received from the data management service (see e.g., FIGS. 1A and 1B). Further, the connection establishment attempt may, for example, be facilitated using a management network (e.g., various applications, tools, processes, etc. directed to provisioning, operating, maintaining, administrating, and/or securing any granularity of the asset protection infrastructure—i.e., the system (see e.g., FIG. 1A)).

In Step 402, a determination is made as to whether establishment of a connection (attempted in Step 400) to the target storage succeeded. In one or many embodiment(s) described herein, if it is determined that said connection attempt failed, then the method proceeds to Step 404. On the other hand, in one or many other embodiment(s) described herein, if it is alternatively determined that said connection attempt succeeded, then the method alternatively proceeds to Step 408.

In Step 404, following the determination (made in Step 402) that establishment of a connection (attempted in Step 400) to the target storage failed, a target storage connection attempt result is recorded. In one or many embodiment(s) described herein, the target storage connection attempt result may refer to a piece of information reflective of the result obtained through the attempted connection establishment with the target storage. Further, the target storage connection attempt result may reflect said result as a failure.

In Step 406, a target storage configuration state, respective to the target storage, is obtained. In one or many embodiment(s) described herein, the target storage configuration state may refer to information that collectively summarizes said current viability of the said specified target storage towards enabling/supporting the protection of any enterprise information (e.g., asset data and/or metadata) stored on/by said specified asset. Further, the target storage configuration state may include or specify the target storage connection attempt result (recorded in Step 404).

In Step 408, following the alternate determination (made in Step 402) that establishment of a connection (attempted in Step 400) to the target storage succeeded, a target storage connection attempt result is recorded. In one or many embodiment(s) described herein, the target storage connection attempt result may refer to a piece of information reflective of the result obtained through the attempted connection establishment with the target storage. Further, the target storage connection attempt result may reflect said result as a success.

In Step 410, any number of target storage network interfaces is/are is discovered. In one or many embodiment(s) described herein, any target storage network interface may refer to networking hardware (e.g., a network card or adapter), a computer program implementing a logical interface (e.g., an application programming interface (API)) and executing on the underlying hardware of the target storage, an interactivity protocol, or any combination thereof, configured to enable or facilitate communications (or information exchange) between the target storage and other entities (e.g., the proxy node performing the instant method). Further, any number of existing network interface discovery techniques may be used to discover the target storage network interface(s).

In Step 412, the target storage network interface(s) (discovered in Step 410) (or more specifically, identification metadata descriptive thereof) is/are recorded. In one or many embodiment(s) described herein, said recorded identification metadata for any given target storage network interface may include, but may not be limited to: a network interface name (e.g., 'eth0' for a first Ethernet interface, 'lo' for a loopback interface, 'wlan0' for a first wireless network interface, etc.) assigned to or associated with the given target storage network interface; and a network layer (e.g., Internet Protocol (IP)) address assigned to or associated with the given target storage network interface. Further, said recorded identification metadata, for any given target storage network interface, is not limited to the aforementioned specific examples.

In Step 414, any number of target storage network interface performance metrics, for each of the target storage network interface(s) (discovered in Step 410), is/are collected. In one or many embodiment(s) described herein, any target storage network interface performance metric may refer to a measurable parameter reflecting a qualitative or quantitative assessment of the network performance exhibited by a given target storage network interface. Examples of said target storage network interface performance metric(s), for a given target storage network interface, may include: a bandwidth—i.e., a maximum (theoretical) amount or capacity of data/information (e.g., typically expressed in bits or bytes per second) that can be received and/or transmitted through the given target storage network interface; and a throughput—i.e., a maximum (empirical) amount or capacity of data/information (e.g., typically expressed in bits or bytes per second) that has been received and/or transmitted through the given target storage network interface. Further, said target storage network interface performance metric(s), for any given target storage network interface, is/are not limited to the aforementioned specific examples.

Hereinafter, following Step 414, the method proceeds to Step 420 (see e.g., FIG. 4B).

Turning to FIG. 4B, in Step 420, the target storage network interface performance metric(s) (collected in Step 414), for each of the target storage network interface(s) (discovered in Step 410), is/are recorded.

In Step 422, a preferred target storage network interface is identified. In one or many embodiment(s) described herein, the preferred target storage network interface may be identified from the target storage network interface(s) (discovered in Step 410) and based on the target storage network interface metric(s) (collected in Step 414). The preferred target storage network interface, for example, may be identified as the target storage network interface, of the target storage network interface(s), that exhibits the best target storage network interface metric(s) (e.g., a highest bandwidth and/or throughput). The preferred target storage network interface, accordingly, may refer to a target storage network interface that exhibits the best or optimal network performance.

In Step 424, the preferred target storage network interface (identified in Step 422) is recorded.

In Step 426, a target storage configuration state, respective to the target storage, is obtained. In one or many embodiment(s) described herein, the target storage configuration state may refer to information that collectively summarizes said current viability of the said specified target storage towards enabling/supporting the protection of any enterprise information (e.g., asset data and/or metadata) stored on/by said specified asset. Further, the target storage configuration state may include or specify: the target storage connection attempt result (recorded in Step 408); the identification metadata for each of discovered target storage network interface(s) (recorded in Step 412); the target storage network interface performance metric(s) for each of the discovered target storage network interface(s) (recorded in Step 420); and the preferred target storage network interface (recorded in Step 424).

FIGS. 5A-5F show flowcharts describing a method for asset backup configuration checking in accordance with one or more embodiments described herein. The various steps outlined below may be performed by any proxy node (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Figure 5A:
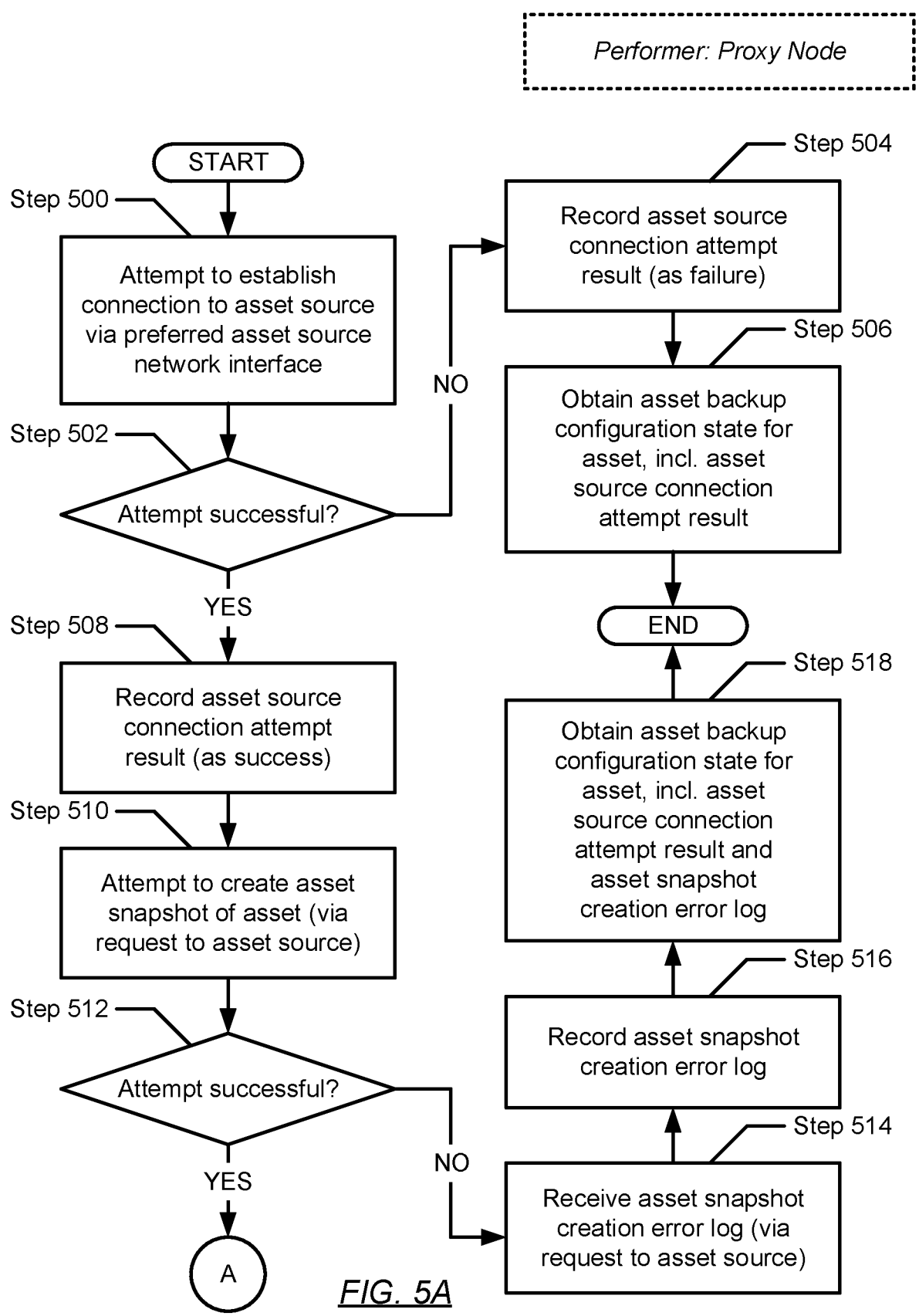
FIGS. 5A-5F show flowcharts describing a method for asset backup configuration checking in accordance with one or more embodiments described herein.

Turning to FIG. 5A, in Step 500, establishment of a connection to an asset source is attempted. In one or many embodiment(s) described herein, the asset source (see e.g., FIGS. 1A and 1D) may have been specified in a configuration check request (see e.g., FIGS. 2A and 2B) received from the data management service (see e.g., FIGS. 1A and 1B). Further, the connection establishment attempt may, for example, be facilitated using a management network (e.g., various applications, tools, processes, etc. directed to provisioning, operating, maintaining, administrating, and/or securing any granularity of the asset protection infrastructure—i.e., the system (see e.g., FIG. 1A)), as well as using a preferred asset source network interface (identified in FIGS. 3A and 3B) of the asset source.

In Step 502, a determination is made as to whether establishment of a connection (attempted in Step 500) to the asset source succeeded. In one or many embodiment(s) described herein, if it is determined that said connection attempt failed, then the method proceeds to Step 504. On the other hand, in one or many other embodiment(s) described herein, if it is alternatively determined that said connection attempt succeeded, then the method alternatively proceeds to Step 508.

In Step 504, following the determination (made in Step 502) that establishment of a connection (attempted in Step 500) to the asset source failed, an asset source connection attempt result is recorded. In one or many embodiment(s) described herein, the asset source connection attempt result may refer to a piece of information reflective of the result obtained through the attempted connection establishment with the asset source. Further, the asset source connection attempt result may reflect said result as a failure.

In Step 506, an asset backup configuration state, respective to an asset, is obtained. In one or many embodiment(s) described herein, the asset (see e.g., FIGS. 1A and 1D) may be hosted on or accessible through the asset source (to which establishment of a connection had been attempted in Step 500) and may have been specified in the configuration check request received from the data management service. The asset backup configuration state may refer to information that collectively summarizes said current viability of any enterprise information (e.g., asset data and/or metadata), stored on/by the said specified asset, towards undergoing any backup operation(s) that, at least in part, enable/support the protection of said enterprise information. Further, the asset backup configuration state may include or specify the asset source connection attempt result (recorded in Step 504).

In Step 508, following the alternate determination (made in Step 502) that establishment of a connection (attempted in Step 500) to the asset source succeeded, an asset source connection attempt result is recorded. In one or many embodiment(s) described herein, the asset source connection attempt result may refer to a piece of information reflective of the result obtained through the attempted connection establishment with the asset source. Further, the asset source connection attempt result may reflect said result as a success.

In Step 510, a creation of an asset snapshot is attempted. In one or many embodiment(s) described herein, the asset snapshot may refer to a copy of the data and/or metadata, representative of or reflected in an asset, at a current point-in-time. The asset (see e.g., FIGS. 1A and 1D), meanwhile, may be hosted on or accessible through the asset source (to which establishment of a connection had been attempted in Step 500) and may have been specified in the configuration check request received from the data management service. Further, said attempted creation of the asset snapshot may be facilitated via a request directed to the asset source.

In Step 512, a determination is made as to whether the creation of an asset snapshot (attempted in Step 510) succeeded. In one or many embodiment(s) described herein, if it is determined that said attempt to create an asset snapshot failed, then the method proceeds to Step 514. On the other hand, in one or many other embodiment(s) described herein, if it is alternatively determined that said attempt to create an asset snapshot succeeded, then the method alternatively proceeds to Step 522 (see e.g., FIG. 5B).

In Step 514, following the determination (made in Step 512) that creation of an asset snapshot (attempted in Step 510) failed, an asset snapshot creation error log is received. In one or many embodiment(s) described herein, the asset snapshot creation error log may refer to a document (e.g., a JavaScript Object Notation (JSON) file, a Comma Separated Values (CSV) file, a Yet Another Markup Language (YAML) file, etc.) configured to record any number of error conditions and/or events respective to, or that transpired during, the asset snapshot creation attempt. Further, said receipt of the asset snapshot creation error log may be facilitated via a request directed to the asset source and thus also received therefrom in response to said request.

In Step 516, the asset snapshot creation error log (received in Step 514) is recorded.

In Step 518, an asset backup configuration state, respective to the asset (of which creation of an asset snapshot had been attempted in Step 510), is obtained. In one or many embodiment(s) described herein, the asset backup configuration state may refer to information that collectively summarizes said current viability of any enterprise information (e.g., asset data and/or metadata), stored on/by the said specified asset, towards undergoing any backup operation(s)

that, at least in part, enable/support the protection of said enterprise information. Further, the asset backup configuration state may include or specify: the asset source connection attempt result (recorded in Step 508); and the asset snapshot creation error log (recorded in Step 516).

Figure 5B:
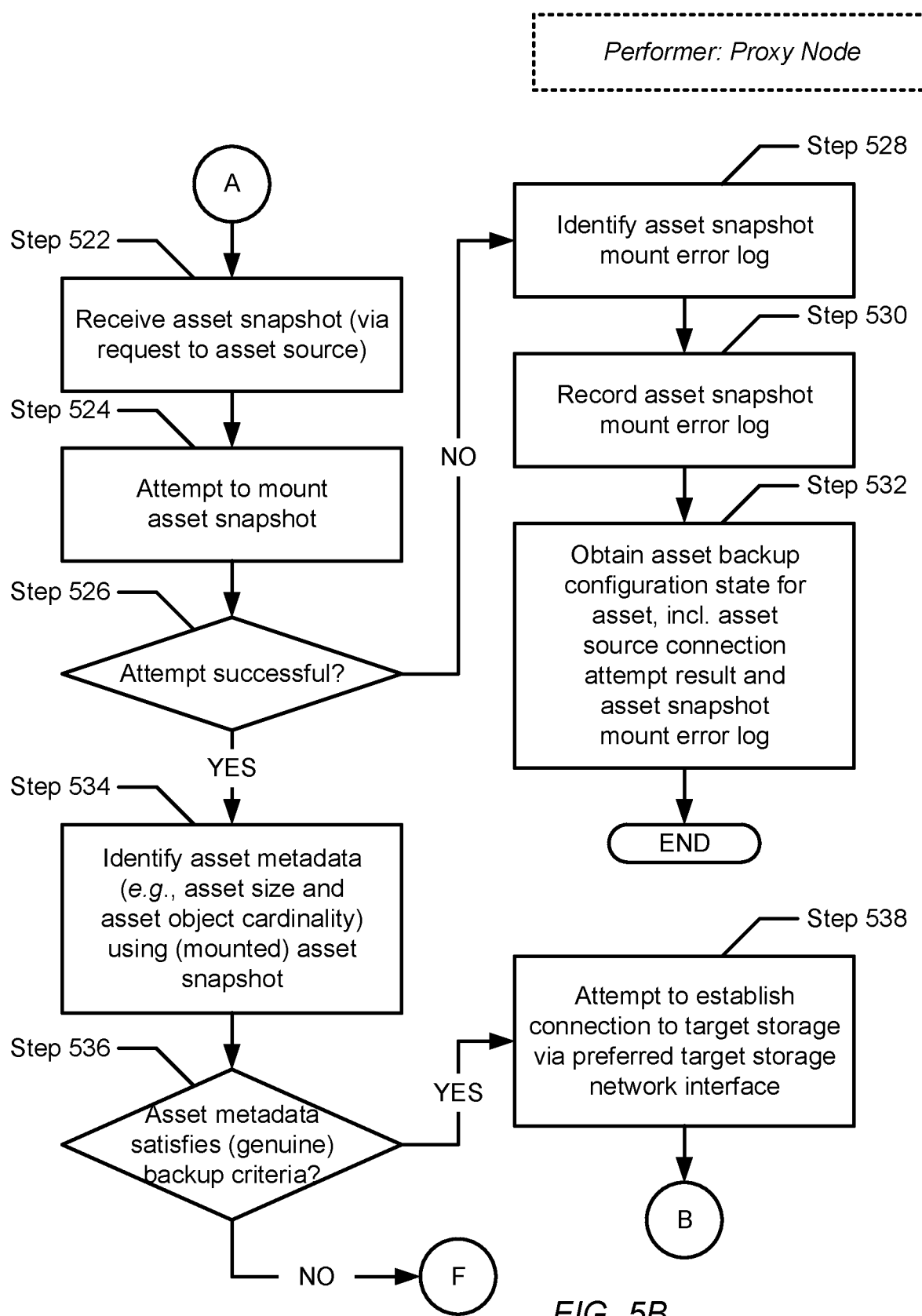

Turning to FIG. 5B, in Step 522, following the alternate determination (made in Step 512) that creation of an asset snapshot (attempted in Step 510) succeeded, the asset snapshot is received. In one or many embodiment(s) described herein, said receipt of the asset snapshot may be facilitated via a request directed to the asset source and thus also received therefrom in response to said request.

In Step 524, a mounting of the asset snapshot (received in Step 522) is attempted. In one or many embodiment(s) described herein, said attempted mounting of the asset snapshot may entail attempting to make any file system implementation(s), representative of the asset snapshot, read and/or write accessible (locally on or through the proxy node performing the instant method).

In Step 526, a determination is made as to whether a mounting of the asset snapshot (attempted in Step 524) succeeded. In one or many embodiment(s) described herein, if it is determined that said attempt to mount the asset snapshot failed, then the method proceeds to Step 528. On the other hand, in one or many other embodiment(s) described herein, if it is alternatively determined that said attempt to mount the asset snapshot succeeded, then the method alternatively proceeds to Step 534.

In Step 528, following the determination (made in Step 526) that a mounting of the asset snapshot (attempted in Step 524) failed, an asset snapshot mount error log is identified. In one or many embodiment(s) described herein, the asset snapshot mount error log may refer to a document (e.g., a JavaScript Object Notation (JSON) file, a Comma Separated Values (CSV) file, a Yet Another Markup Language (YAML) file, etc.) configured to record any number of error conditions and/or events respective to, or that transpired during, the asset snapshot mounting attempt.

In Step 530, the asset snapshot mount error log (identified in Step 528) is recorded.

In Step 532, an asset backup configuration state, respective to the asset (of which mounting of the asset snapshot had been attempted in Step 524), is obtained. In one or many embodiment(s) described herein, the asset backup configuration state may refer to information that collectively summarizes said current viability of any enterprise information (e.g., asset data and/or metadata), stored on/by the said specified asset, towards undergoing any backup operation(s) that, at least in part, enable/support the protection of said enterprise information. Further, the asset backup configuration state may include or specify: the asset source connection attempt result (recorded in Step 508); and the asset snapshot mount error log (recorded in Step 530).

In Step 534, following the alternate determination (made in Step 526) that a mounting of the asset snapshot (attempted in Step 524) succeeded, asset metadata, descriptive of the asset, is identified. In one or many embodiment(s) described herein, identification of the asset metadata may be facilitated through/using the mounted asset snapshot. Further, the identified asset metadata may, for example, include: an asset size reflecting an amount of storage space (e.g., typically expressed in bytes) consumed by the asset; and an asset object cardinality reflecting a collective number of file system objects (e.g., directories and/or files) representing the data and/or metadata maintained on/by the asset. The identified asset metadata, moreover, is not limited to the aforementioned specific examples.

In Step 536, a determination is made as to whether the asset metadata (identified in Step 534) satisfies genuine backup criteria. The genuine backup criteria may refer to any number of conditions for triggering a genuine (versus a simulated) backup operation targeting the asset snapshot (determined to be successfully mounted in Step 526). Examples of the genuine backup criteria may include any of the following conditions (whether considered separately or in combination): an asset size of the asset being less than a threshold asset size (e.g., 100 giga-bytes); and/or an asset object cardinality of the asset being less than a threshold asset object cardinality (e.g., 10,000 file system objects). Further, the genuine backup criteria is not limited to the aforementioned specific examples. Accordingly, in one or many embodiment(s) described herein, if it is determined that the asset metadata satisfies the genuine backup criteria, then the method proceeds to Step 538. On the other hand, in one or many other embodiment(s) described herein, if it is alternatively determined that the asset metadata does not satisfy the genuine backup criteria, then the method alternatively proceeds to Step 582 (see e.g., FIG. 5E).

In Step 538, following the determination (made in Step 536) that the asset metadata (identified in Step 534) satisfies genuine backup criteria (defined above—see e.g., Step 536), establishment of a connection to a target storage is attempted. In one or many embodiment(s) described herein, the target storage (see e.g., FIGS. 1A and 1E) may have been specified in the configuration check request received from the data management service. Further, the connection establishment attempt may, for example, be facilitated using a management network (e.g., various applications, tools, processes, etc. directed to provisioning, operating, maintaining, administrating, and/or securing any granularity of the asset protection infrastructure—i.e., the system (see e.g., FIG. 1A)), as well as using a preferred target storage network interface (identified in FIGS. 4A and 4B) of the target storage.

Hereinafter, following Step 538, the method proceeds to Step 542 (see e.g., FIG. 5C).

Figure 5C:
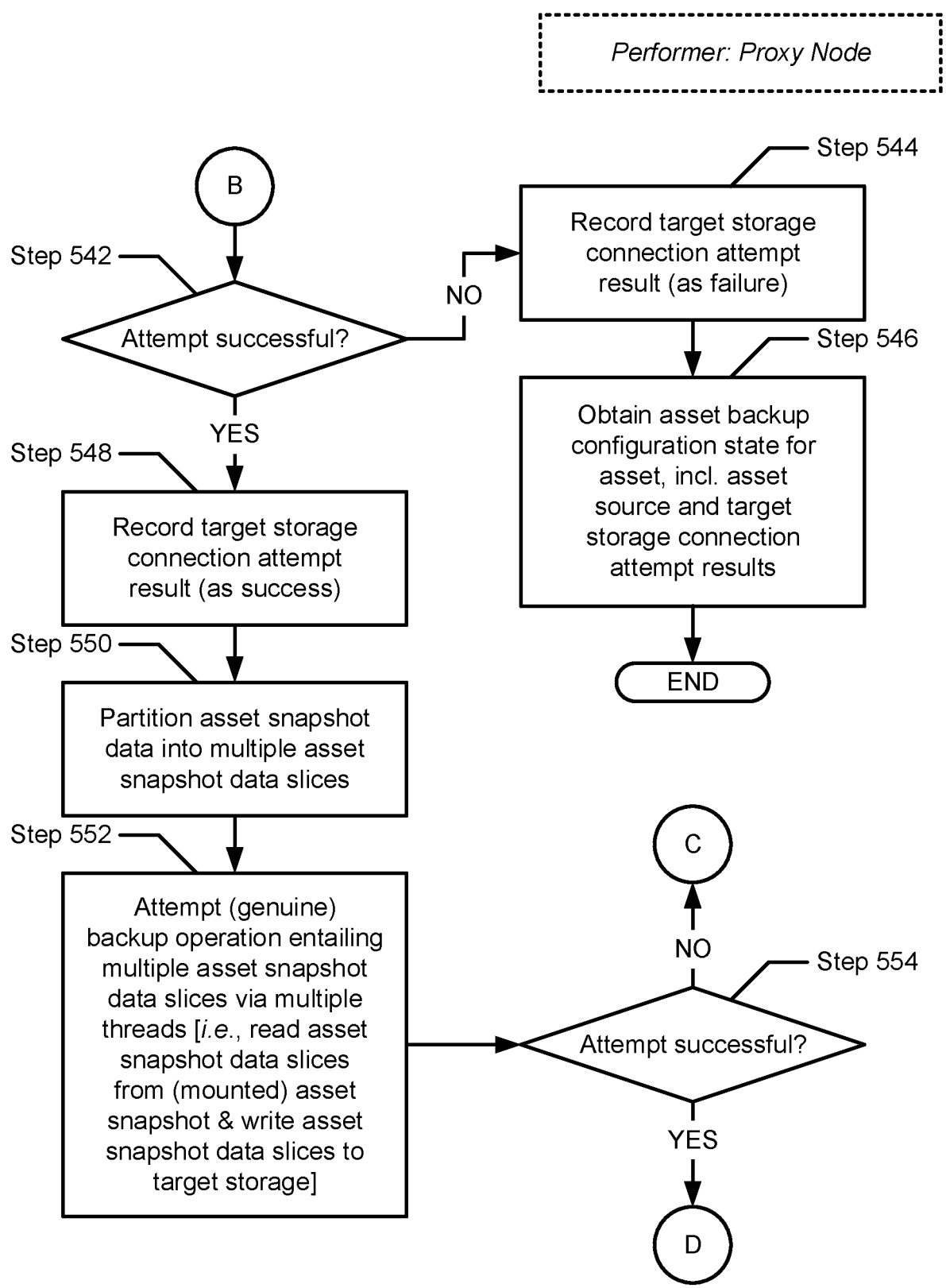

Turning to FIG. 5C, in Step 542, a determination is made as to whether establishment of a connection (attempted in Step 538) to the target storage succeeded. In one or many embodiment(s) described herein, if it is determined that said connection attempt failed, then the method proceeds to Step 544. On the other hand, in one or many other embodiment(s) described herein, if it is alternatively determined that said connection attempt succeeded, then the method alternatively proceeds to Step 548.

In Step 544, following the determination (made in Step 542) that establishment of a connection (attempted in Step 538) to the target storage failed, a target storage connection attempt result is recorded. In one or many embodiment(s) described herein, the target storage connection attempt result may refer to a piece of information reflective of the result obtained through the attempted connection establishment with the target storage. Further, the target storage connection attempt result may reflect said result as a failure.

In Step 546, an asset backup configuration state, respective to the asset, is obtained. In one or many embodiment(s) described herein, the asset backup configuration state may refer to information that collectively summarizes said current viability of any enterprise information (e.g., asset data and/or metadata), stored on/by the said specified asset, towards undergoing any backup operation(s) that, at least in part, enable/support the protection of said enterprise information. Further, the asset backup configuration state may include or specify: the asset source connection attempt result (recorded in Step 508); and the target storage connection attempt result (recorded in Step 544).

In Step 548, following the alternate determination (made in Step 542) that establishment of a connection (attempted in Step 538) to the target storage succeeded, a target storage connection attempt result is recorded. In one or many embodiment(s) described herein, the target storage connection attempt result may refer to a piece of information reflective of the result obtained through the attempted connection establishment with the target storage. Further, the target storage connection attempt result may reflect said result as a success.

In Step 550, asset snapshot data, of the asset snapshot (determined to be successfully mounted in Step 526), is partitioned into multiple asset snapshot data slices. In one or many embodiment(s) described herein, the multiple asset snapshot data slices may be created, respectively, using multiple concurrent or parallel threads. Further, each asset snapshot data slice may be created such that an asset snapshot data slice size thereof does not exceed a predefined asset snapshot data slice size expressed either in bytes (e.g., 20 giga-bytes) or in a number of file system objects (e.g., 1,000 directories and/or files). Moreover, as the asset snapshot may encompass enterprise information (e.g., asset data and/or asset metadata) organized and accessible through one or more file system implementations, each asset snapshot data slice created therefrom may include a portion of said enterprise information, as well as a corresponding portion of said file system implementation(s) respectively organizing and providing accessibility to said enterprise information portion.

In Step 552, performance of a genuine backup operation is attempted. In one or many embodiment(s) described herein, attempting the genuine backup operation may entail two processes: (a) the reading of the multiple asset snapshot data slices (created in Step 550), respectively using multiple concurrent or parallel threads, from the mounted asset snapshot; and (b) the writing of said read multiple asset snapshot data slices, respectively using multiple concurrent or parallel threads, to the target storage.

In Step 554, a determination is made as to whether the genuine backup operation (attempted in Step 552) succeeded. In one or many embodiment(s) described herein, if it is determined that said attempt to perform the genuine backup operation failed, then the method proceeds to Step 558 (see e.g., FIG. 5D). On the other hand, in one or many other embodiment(s) described herein, if it is alternatively determined that said attempt to perform the genuine backup operation succeeded, then the method alternatively proceeds to Step 566 (see e.g., FIG. 5D).

Figure 5D:
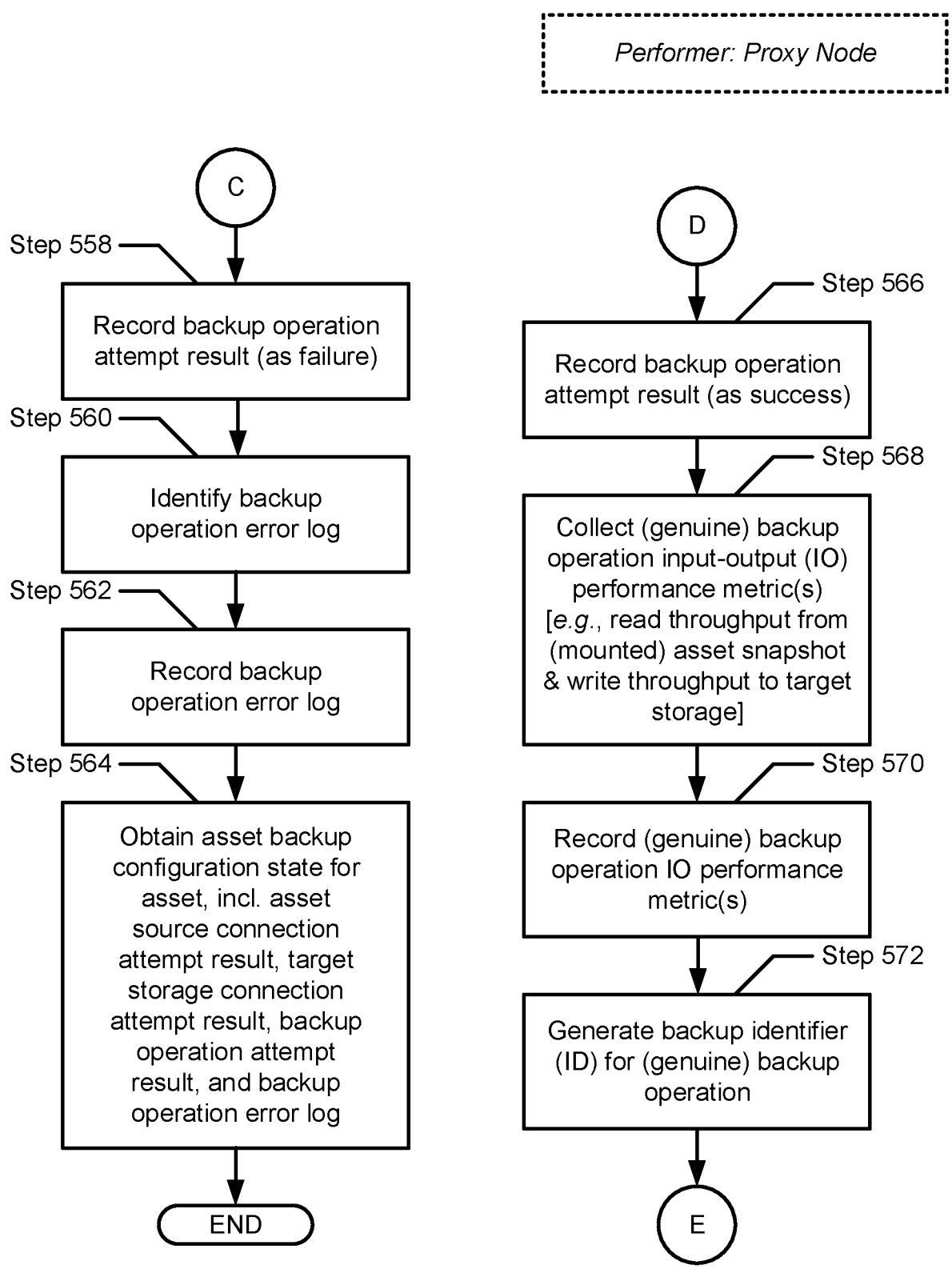

Turning to FIG. 5D, in Step 556, following the determination (made in Step 554) that a genuine backup operation (attempted in Step 552) failed, a backup operation attempt result is recorded. In one or many embodiment(s) described herein, the backup operation attempt result may refer to a piece of information reflective of the result obtained through the attempted performance of a genuine (or simulated) backup operation. Further, the backup operation attempt result may reflect said result as a failure.

In Step 560, a backup operation error log is identified. In one or many embodiment(s) described herein, the backup operation error log may refer to a document (e.g., a JavaScript Object Notation (JSON) file, a Comma Separated Values (CSV) file, a Yet Another Markup Language (YAML) file, etc.) configured to record any number of error conditions and/or events respective to, or that transpired during, the attempt to perform the genuine backup operation.

In Step 562, the backup operation error log (identified in Step 560) is recorded.

In Step 564, an asset backup configuration state, respective to the asset, is obtained. In one or many embodiment(s) described herein, the asset backup configuration state may refer to information that collectively summarizes said current viability of any enterprise information (e.g., asset data and/or metadata), stored on/by the said specified asset, towards undergoing any backup operation(s) that, at least in part, enable/support the protection of said enterprise information. Further, the asset backup configuration state may include or specify: the asset source connection attempt result (recorded in Step 508); the target storage connection attempt result (recorded in Step 548); the backup operation attempt result (recorded in Step 558); and the backup operation error log (recorded in Step 562).

In Step 566, following the alternate determination (made in Step 554) that a genuine backup operation (attempted in Step 552) succeeded, a backup operation attempt result is recorded. In one or many embodiment(s) described herein, the backup operation attempt result may refer to a piece of information reflective of the result obtained through the attempted performance of a genuine (or simulated) backup operation. Further, the backup operation attempt result may reflect said result as a success.

In Step 568, any number of genuine backup operation input-output (IO) performance metrics, respective to the genuine backup operation (determined to have been successfully performed in Step 554), is/are collected. In one or many embodiment(s) described herein, any genuine backup operation IO performance metric may refer to a measurable parameter reflecting a qualitative or quantitative assessment of the IO performance exhibited during the genuine backup operation. Examples of said genuine backup operation IO performance metric(s), respective to the genuine backup operation, may include: a read throughput—i.e., a maximum (empirical) amount or capacity of data/information (e.g., typically expressed in bits or bytes per second) that has been read from a data source (e.g., the mounted asset snapshot); and a write throughput—i.e., a maximum (empirical) amount or capacity of data/information (e.g., typically expressed in bits or bytes per second) that has been written to a data target (e.g., the target storage). Further, said genuine backup operation IO performance metric(s), respective to the genuine backup operation, is/are not limited to the aforementioned specific examples.

In Step 570, the genuine backup operation IO performance metric(s) (collected in Step 568) is/are recorded.

In Step 572, a backup identifier (ID) is generated. In one or many embodiment(s) described herein, the backup ID may refer to an alphanumeric character string, of any arbitrary length, that uniquely identifies the genuine backup operation (determined to have been successfully performed in Step 554).

Hereinafter, following Step 572, the method proceeds to Step 576 (see e.g., FIG. 5E).

Figure 5E:
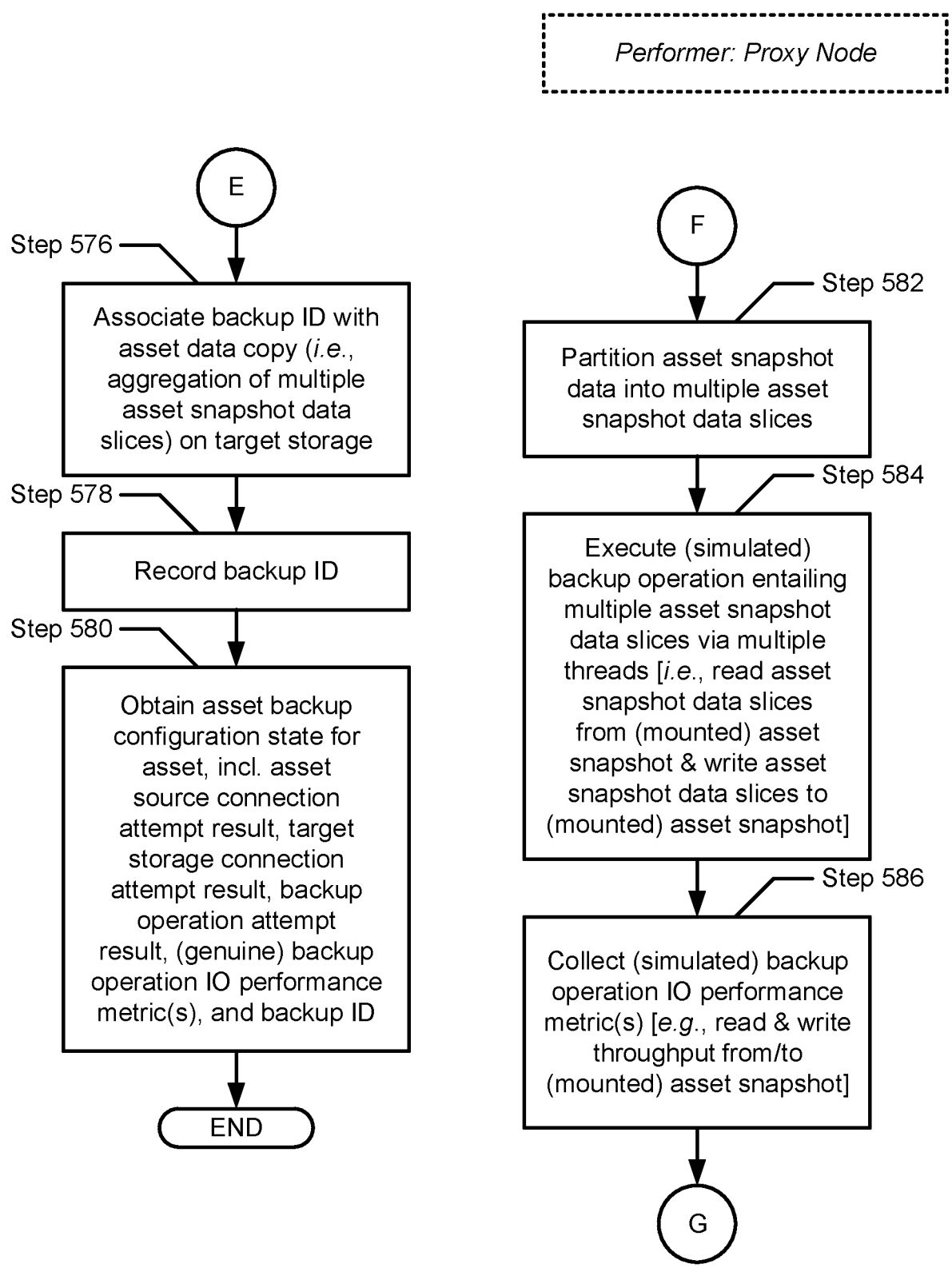

Turning to FIG. 5E, in Step 576, the backup ID (generated in Step 572) is associated with an asset data copy (see e.g., FIG. 1E) maintained on the target storage. In one or many embodiment(s) described herein, the asset data copy may refer to a backup copy of asset data belonging to the specified asset. Further, the asset data copy may form from the aggregation of the multiple asset snapshot data slices (written to the target storage via the genuine backup operation determined to have been a success in Step 554).

In Step 578, the backup ID (generated in Step 572) is recorded.

In Step 580, an asset backup configuration state, respective to the asset, is obtained. In one or many embodiment(s) described herein, the asset backup configuration state may refer to information that collectively summarizes said current viability of any enterprise information (e.g., asset data and/or metadata), stored on/by the said specified asset, towards undergoing any backup operation(s) that, at least in part, enable/support the protection of said enterprise information. Further, the asset backup configuration state may include or specify: the asset source connection attempt result (recorded in Step 508); the target storage connection attempt result (recorded in Step 548); the backup operation attempt result (recorded in Step 566); the genuine backup operation IO performance metric(s) (recorded in Step 570); and the backup ID (recorded in Step 578).

In Step 582, following the alternate determination (made in Step 536) that the asset metadata (identified in Step 534) does not satisfy the genuine backup criteria (defined above—see e.g., Step 536), asset snapshot data, of the asset snapshot (determined to be successfully mounted in Step 526), is partitioned into multiple asset snapshot data slices. In one or many embodiment(s) described herein, the multiple asset snapshot data slices may be created, respectively, using multiple concurrent or parallel threads. Further, each asset snapshot data slice may be created such that an asset snapshot data slice size thereof does not exceed a predefined asset snapshot data slice size expressed either in bytes (e.g., 20 giga-bytes) or in a number of file system objects (e.g., 1,000 directories and/or files). Moreover, as the asset snapshot may encompass enterprise information (e.g., asset data and/or asset metadata) organized and accessible through one or more file system implementations, each asset snapshot data slice created therefrom may include a portion of said enterprise information, as well as a corresponding portion of said file system implementation(s) respectively organizing and providing accessibility to said enterprise information portion.

In Step 584, a simulated backup operation is executed. In one or many embodiment(s) described herein, executing the simulated backup operation may entail two processes: (a) the reading of the multiple asset snapshot data slices (created in Step 582), respectively using multiple concurrent or parallel threads, from the mounted asset snapshot; and (b) the writing of said read multiple asset snapshot data slices, respectively using multiple concurrent or parallel threads, to the mounted asset snapshot.

In Step 586, any number of simulated backup operation input-output (IO) performance metrics, respective to the simulated backup operation (executed in Step 584), is/are collected. In one or many embodiment(s) described herein, any simulated backup operation IO performance metric may refer to a measurable parameter reflecting a qualitative or quantitative assessment of the IO performance exhibited during the simulated backup operation. Examples of said simulated backup operation IO performance metric(s), respective to the simulated backup operation, may include: a read throughput—i.e., a maximum (empirical) amount or capacity of data/information (e.g., typically expressed in bits or bytes per second) that has been read from a data source (e.g., the mounted asset snapshot); and a write throughput—i.e., a maximum (empirical) amount or capacity of data/information (e.g., typically expressed in bits or bytes per second) that has been written to a data target (e.g., the mounted asset snapshot). Further, said simulated backup operation IO performance metric(s), respective to the simulated backup operation, is/are not limited to the aforementioned specific examples.

Hereinafter, following Step 586, the method proceeds to Step 590 (see e.g., FIG. 5F).

Figure 5F:
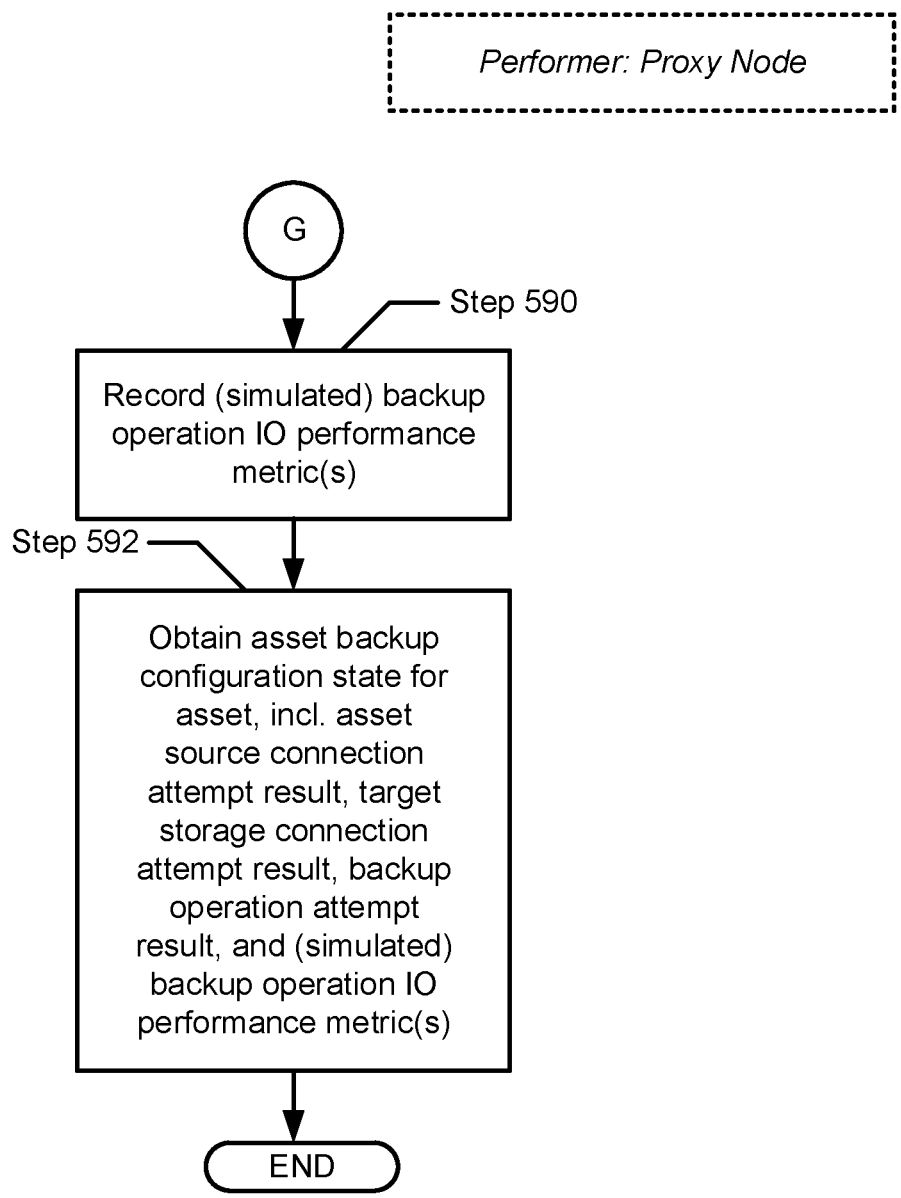

Turning to FIG. 5F, in Step 590, the simulated backup operation IO performance metric(s) (collected in Step 586) is/are recorded.

In Step 592, an asset backup configuration state, respective to the asset, is obtained. In one or many embodiment(s) described herein, the asset backup configuration state may refer to information that collectively summarizes said current viability of any enterprise information (e.g., asset data and/or metadata), stored on/by the said specified asset, towards undergoing any backup operation(s) that, at least in part, enable/support the protection of said enterprise information. Further, the asset backup configuration state may include or specify: the asset source connection attempt result (recorded in Step 508); the target storage connection attempt result (recorded in Step 548); the backup operation attempt result (recorded in Step 566); and the simulated backup operation IO performance metric(s) (recorded in Step 590).

FIGS. 6A-6D show flowcharts describing a method for asset restore configuration checking in accordance with one or more embodiments described herein. The various steps outlined below may be performed by any proxy node (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Figure 6A:
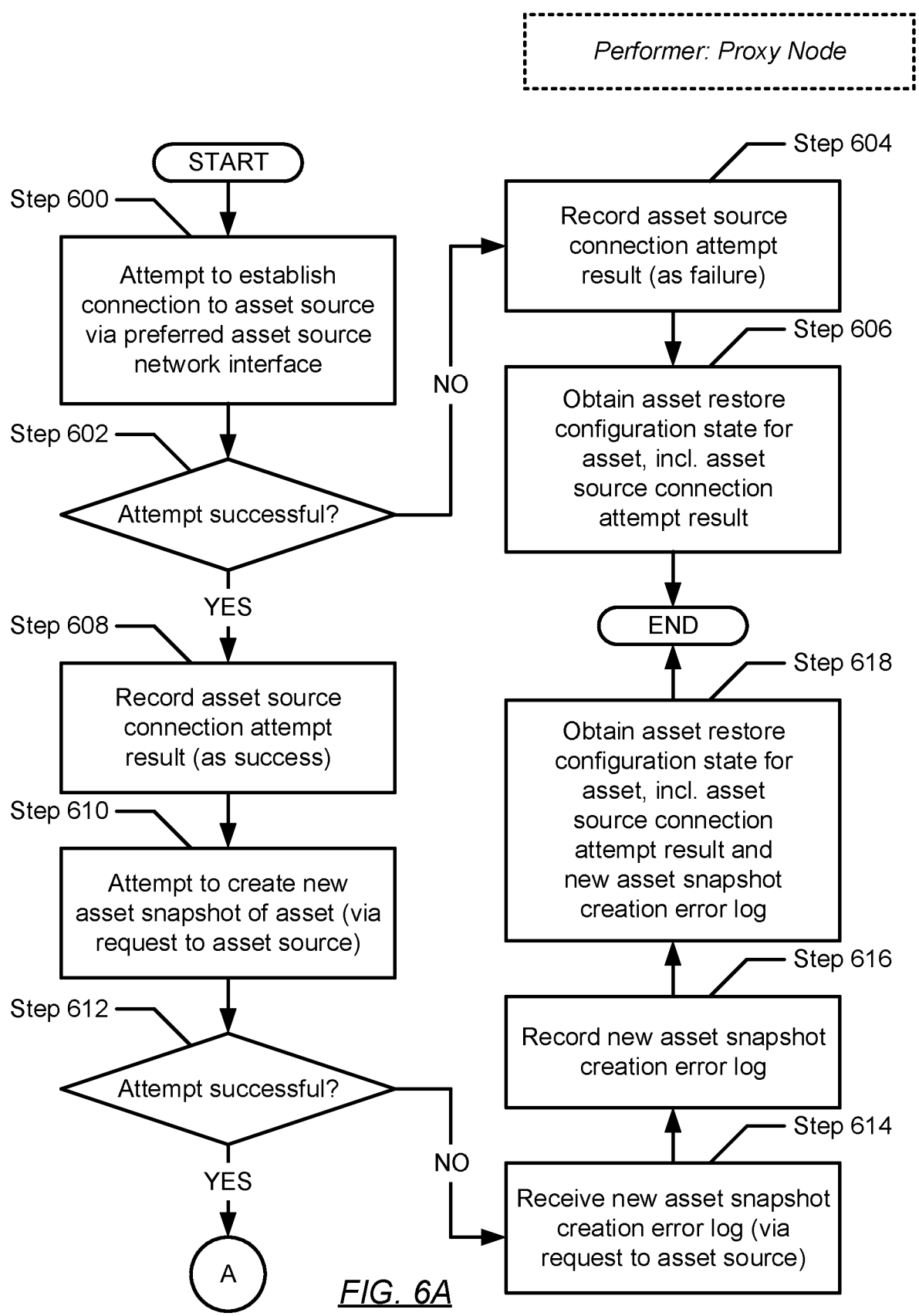
FIGS. 6A-6D show flowcharts describing a method for asset restore configuration checking in accordance with one or more embodiments described herein.

Turning to FIG. 6A, in Step 600, establishment of a connection to an asset source is attempted. In one or many embodiment(s) described herein, the asset source (see e.g., FIGS. 1A and 1D) may have been specified in a configuration check request (see e.g., FIGS. 2A and 2B) received from the data management service (see e.g., FIGS. 1A and 1B). Further, the connection establishment attempt may, for example, be facilitated using a management network (e.g., various applications, tools, processes, etc. directed to provisioning, operating, maintaining, administrating, and/or securing any granularity of the asset protection infrastructure—i.e., the system (see e.g., FIG. 1A)), as well as using a preferred asset source network interface (identified in FIGS. 3A and 3B) of the asset source.

In Step 602, a determination is made as to whether establishment of a connection (attempted in Step 600) to the asset source succeeded. In one or many embodiment(s) described herein, if it is determined that said connection attempt failed, then the method proceeds to Step 604. On the other hand, in one or many other embodiment(s) described herein, if it is alternatively determined that said connection attempt succeeded, then the method alternatively proceeds to Step 608.

In Step 604, following the determination (made in Step 602) that establishment of a connection (attempted in Step 600) to the asset source failed, an asset source connection attempt result is recorded. In one or many embodiment(s) described herein, the asset source connection attempt result may refer to a piece of information reflective of the result obtained through the attempted connection establishment with the asset source. Further, the asset source connection attempt result may reflect said result as a failure.

In Step 606, an asset restore configuration state, respective to an asset, is obtained. In one or many embodiment(s) described herein, the asset (see e.g., FIGS. 1A and 1D) may be hosted on or accessible through the asset source (to which establishment of a connection had been attempted in Step 600) and may have been specified in the configuration check request received from the data management service. The asset restore configuration state may refer to information that collectively summarizes said current viability of any enterprise information (e.g., asset data and/or metadata), stored on/by the said specified asset, towards undergoing any restore operation(s) that, at least in part, enable/support the protection of said enterprise information. Further, the asset restore configuration state may include or specify the asset source connection attempt result (recorded in Step 604).

In Step 608, following the alternate determination (made in Step 602) that establishment of a connection (attempted in Step 600) to the asset source succeeded, an asset source connection attempt result is recorded. In one or many embodiment(s) described herein, the asset source connection attempt result may refer to a piece of information reflective of the result obtained through the attempted connection establishment with the asset source. Further, the asset source connection attempt result may reflect said result as a success.

In Step 610, a creation of a new asset snapshot is attempted. In one or many embodiment(s) described herein, the new asset snapshot may refer to a copy of the data and/or metadata, representative of or reflected in an asset, at a current point-in-time. The asset (see e.g., FIGS. 1A and 1D), meanwhile, may be hosted on or accessible through the asset source (to which establishment of a connection had been attempted in Step 500) and may have been specified in the configuration check request received from the data management service. Further, said attempted creation of the new asset snapshot may be facilitated via a request directed to the asset source.

In Step 612, a determination is made as to whether the creation of a new asset snapshot (attempted in Step 610) succeeded. In one or many embodiment(s) described herein, if it is determined that said attempt to create a new asset snapshot failed, then the method proceeds to Step 614. On the other hand, in one or many other embodiment(s) described herein, if it is alternatively determined that said attempt to create a new asset snapshot succeeded, then the method alternatively proceeds to Step 622 (see e.g., FIG. 6B).

In Step 614, following the determination (made in Step 612) that creation of a new asset snapshot (attempted in Step 610) failed, a new asset snapshot creation error log is received. In one or many embodiment(s) described herein, the new asset snapshot creation error log may refer to a document (e.g., a JavaScript Object Notation (JSON) file, a Comma Separated Values (CSV) file, a Yet Another Markup Language (YAML) file, etc.) configured to record any number of error conditions and/or events respective to, or that transpired during, the new asset snapshot creation attempt. Further, said receipt of the new asset snapshot creation error log may be facilitated via a request directed to the asset source and thus also received therefrom in response to said request.

In Step 616, the new asset snapshot creation error log (received in Step 614) is recorded.

In Step 618, an asset restore configuration state, respective to the asset (of which creation of an asset snapshot had been attempted in Step 510), is obtained. In one or many embodiment(s) described herein, the asset restore configuration state may refer to information that collectively summarizes said current viability of any enterprise information (e.g., asset data and/or metadata), stored on/by the said specified asset, towards undergoing any restore operation(s) that, at least in part, enable/support the protection of said enterprise information. Further, the asset restore configuration state may include or specify: the asset source connection attempt result (recorded in Step 608); and the new asset snapshot creation error log (recorded in Step 616).

Figure 6B:
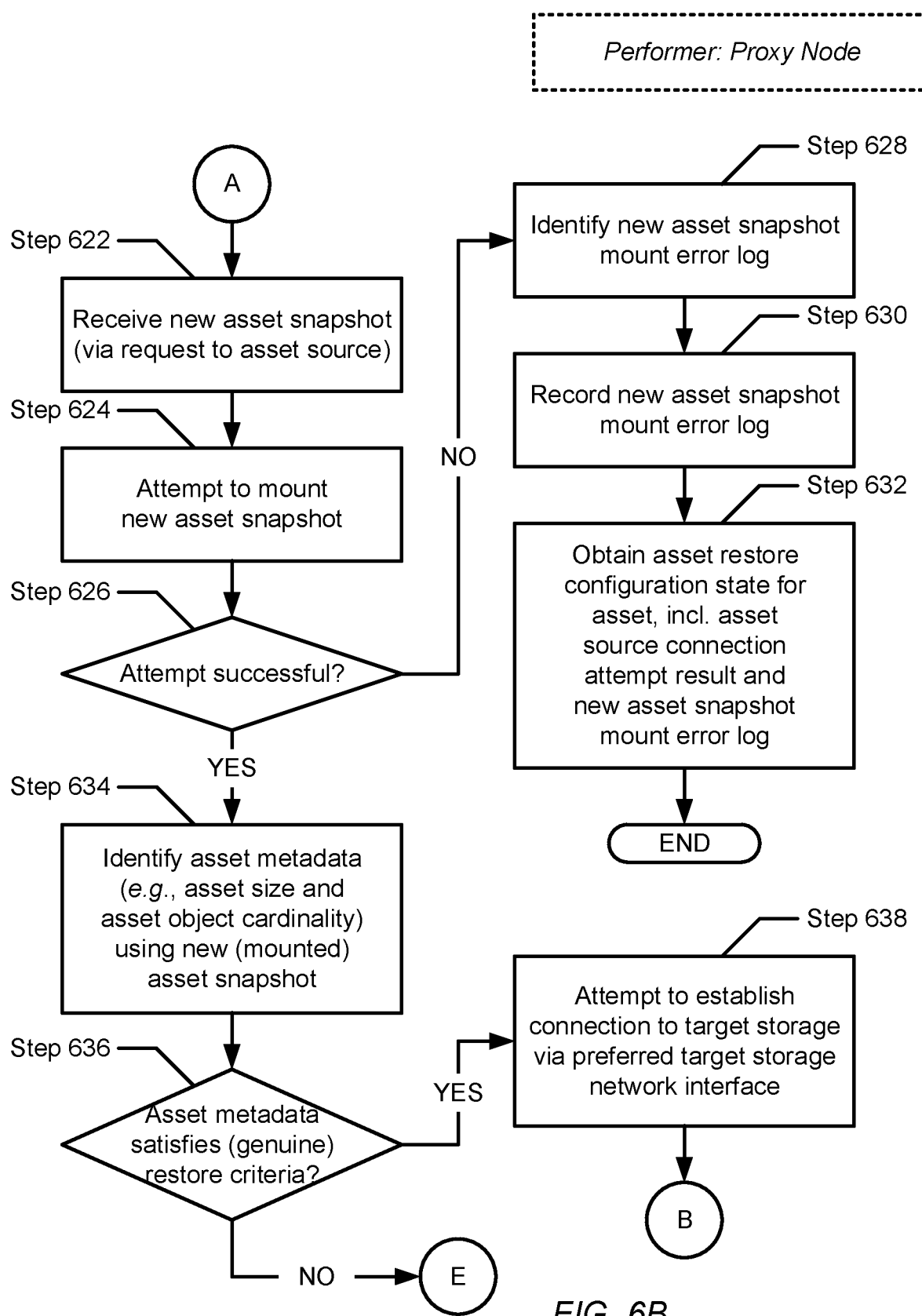

Turning to FIG. 6B, in Step 622, following the alternate determination (made in Step 612) that creation of a new asset snapshot (attempted in Step 610) succeeded, the new asset snapshot is received. In one or many embodiment(s) described herein, said receipt of the new asset snapshot may be facilitated via a request directed to the asset source and thus also received therefrom in response to said request.

In Step 624, a mounting of the new asset snapshot (received in Step 622) is attempted. In one or many embodiment(s) described herein, said attempted mounting of the new asset snapshot may entail attempting to make any file system implementation(s), representative of the new asset snapshot, read and/or write accessible (locally on or through the proxy node performing the instant method).

In Step 626, a determination is made as to whether a mounting of the new asset snapshot (attempted in Step 624) succeeded. In one or many embodiment(s) described herein, if it is determined that said attempt to mount the new asset snapshot failed, then the method proceeds to Step 628. On the other hand, in one or many other embodiment(s) described herein, if it is alternatively determined that said attempt to mount the new asset snapshot succeeded, then the method alternatively proceeds to Step 634.

In Step 628, following the determination (made in Step 626) that a mounting of the new asset snapshot (attempted in Step 624) failed, a new asset snapshot mount error log is identified. In one or many embodiment(s) described herein, the new asset snapshot mount error log may refer to a document (e.g., a JavaScript Object Notation (JSON) file, a Comma Separated Values (CSV) file, a Yet Another Markup Language (YAML) file, etc.) configured to record any number of error conditions and/or events respective to, or that transpired during, the new asset snapshot mounting attempt.

In Step 630, the new asset snapshot mount error log (identified in Step 628) is recorded.

In Step 632, an asset restore configuration state, respective to the asset (of which mounting of the asset snapshot had been attempted in Step 524), is obtained. In one or many embodiment(s) described herein, the asset restore configuration state may refer to information that collectively summarizes said current viability of any enterprise information (e.g., asset data and/or metadata), stored on/by the said specified asset, towards undergoing any restore operation(s) that, at least in part, enable/support the protection of said enterprise information. Further, the asset restore configuration state may include or specify: the asset source connection attempt result (recorded in Step 608); and the new asset snapshot mount error log (recorded in Step 630).

In Step 634, following the alternate determination (made in Step 626) that a mounting of the new asset snapshot (attempted in Step 624) succeeded, asset metadata, descriptive of the asset, is identified. In one or many embodiment(s) described herein, identification of the asset metadata may be facilitated through/using the mounted, new asset snapshot. Further, the identified asset metadata may, for example, include: an asset size reflecting an amount of storage space (e.g., typically expressed in bytes) consumed by the asset; and an asset object cardinality reflecting a collective number of file system objects (e.g., directories and/or files) representing the data and/or metadata maintained on/by the asset. The identified asset metadata, moreover, is not limited to the aforementioned specific examples.

In Step 636, a determination is made as to whether the asset metadata (identified in Step 634) satisfies genuine restore criteria. The genuine restore criteria may refer to any number of conditions for triggering a genuine restore operation targeting the new asset snapshot (determined to be successfully mounted in Step 626). Examples of the genuine restore criteria may include any of the following conditions (whether considered separately or in combination): an asset size of the asset being less than a threshold asset size (e.g., 100 giga-bytes); and/or an asset object cardinality of the asset being less than a threshold asset object cardinality (e.g., 10,000 file system objects). Further, the genuine restore criteria is not limited to the aforementioned specific examples. Accordingly, in one or many embodiment(s) described herein, if it is determined that the asset metadata satisfies the genuine restore criteria, then the method proceeds to Step 638. On the other hand, in one or many other embodiment(s) described herein, if it is alternatively determined that the asset metadata does not satisfy the genuine restore criteria, then the method alternatively proceeds to Step 674 (see e.g., FIG. 6D).

In Step 638, following the determination (made in Step 636) that the asset metadata (identified in Step 634) satisfies genuine restore criteria (defined above—see e.g., Step 636), establishment of a connection to a target storage is attempted. In one or many embodiment(s) described herein, the target storage (see e.g., FIGS. 1A and 1E) may have been specified in the configuration check request received from the data management service. Further, the connection establishment attempt may, for example, be facilitated using a management network (e.g., various applications, tools, processes, etc. directed to provisioning, operating, maintaining, administrating, and/or securing any granularity of the asset protection infrastructure—i.e., the system (see e.g., FIG. 1A)), as well as using a preferred target storage network interface (identified in FIGS. 4A and 4B) of the target storage.

Hereinafter, following Step 638, the method proceeds to Step 642 (see e.g., FIG. 6C).

Figure 6C:
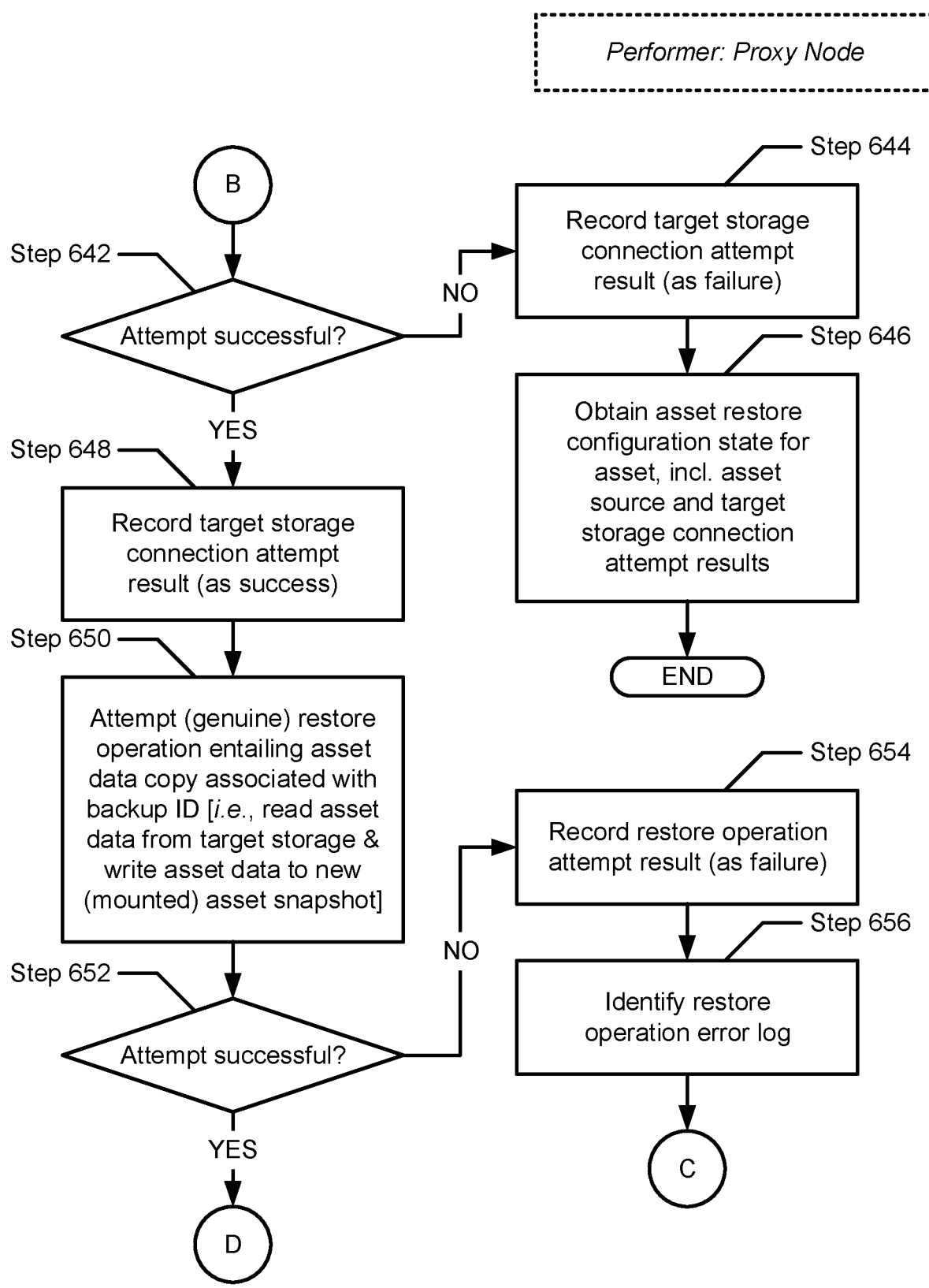

Turning to FIG. 6C, in Step 642, a determination is made as to whether establishment of a connection (attempted in Step 638) to the target storage succeeded. In one or many embodiment(s) described herein, if it is determined that said connection attempt failed, then the method proceeds to Step 644. On the other hand, in one or many other embodiment(s) described herein, if it is alternatively determined that said connection attempt succeeded, then the method alternatively proceeds to Step 648.

In Step 644, following the determination (made in Step 642) that establishment of a connection (attempted in Step 638) to the target storage failed, a target storage connection attempt result is recorded. In one or many embodiment(s) described herein, the target storage connection attempt result may refer to a piece of information reflective of the result obtained through the attempted connection establishment with the target storage. Further, the target storage connection attempt result may reflect said result as a failure.

In Step 646, an asset restore configuration state, respective to the asset, is obtained. In one or many embodiment(s) described herein, the asset restore configuration state may refer to information that collectively summarizes said current viability of any enterprise information (e.g., asset data and/or metadata), stored on/by the said specified asset, towards undergoing any restore operation(s) that, at least in part, enable/support the protection of said enterprise information. Further, the asset restore configuration state may include or specify: the asset source connection attempt result (recorded in Step 608); and the target storage connection attempt result (recorded in Step 644).

In Step 648, following the alternate determination (made in Step 642) that establishment of a connection (attempted in Step 638) to the target storage succeeded, a target storage connection attempt result is recorded. In one or many embodiment(s) described herein, the target storage connection attempt result may refer to a piece of information reflective of the result obtained through the attempted connection establishment with the target storage. Further, the target storage connection attempt result may reflect said result as a success.

In Step 650, performance of a genuine restore operation is attempted. In one or many embodiment(s) described herein, attempting the genuine restore operation may entail two processes: (a) the reading of an asset data copy (e.g., a backup copy of asset data formed from an aggregation of multiple asset snapshot data slices), associated with a backup identifier (ID) uniquely identifying an earlier performed genuine backup operation (see e.g., FIGS. 5A-5F), from the target storage; and (b) the writing of said read asset data copy to the mounted, new asset snapshot.

In Step 652, a determination is made as to whether the genuine restore operation (attempted in Step 650) succeeded. In one or many embodiment(s) described herein, if it is determined that said attempt to perform the genuine restore operation failed, then the method proceeds to Step 654. On the other hand, in one or many other embodiment(s) described herein, if it is alternatively determined that said attempt to perform the genuine restore operation succeeded, then the method alternatively proceeds to Step 664 (see e.g., FIG. 6D).

In Step 654, following the determination (made in Step 652) that a genuine restore operation (attempted in Step 650) failed, a restore operation attempt result is recorded. In one or many embodiment(s) described herein, the restore operation attempt result may refer to a piece of information reflective of the result obtained through the attempted performance of a genuine restore operation. Further, the restore operation attempt result may reflect said result as a failure.

In Step 656, a restore operation error log is identified. In one or many embodiment(s) described herein, the restore operation error log may refer to a document (e.g., a JavaScript Object Notation (JSON) file, a Comma Separated Values (CSV) file, a Yet Another Markup Language (YAML) file, etc.) configured to record any number of error conditions and/or events respective to, or that transpired during, the attempt to perform the genuine restore operation.

Hereinafter, following Step 656, the method proceeds to Step 660 (see e.g., FIG. 6D).

Figure 6D:
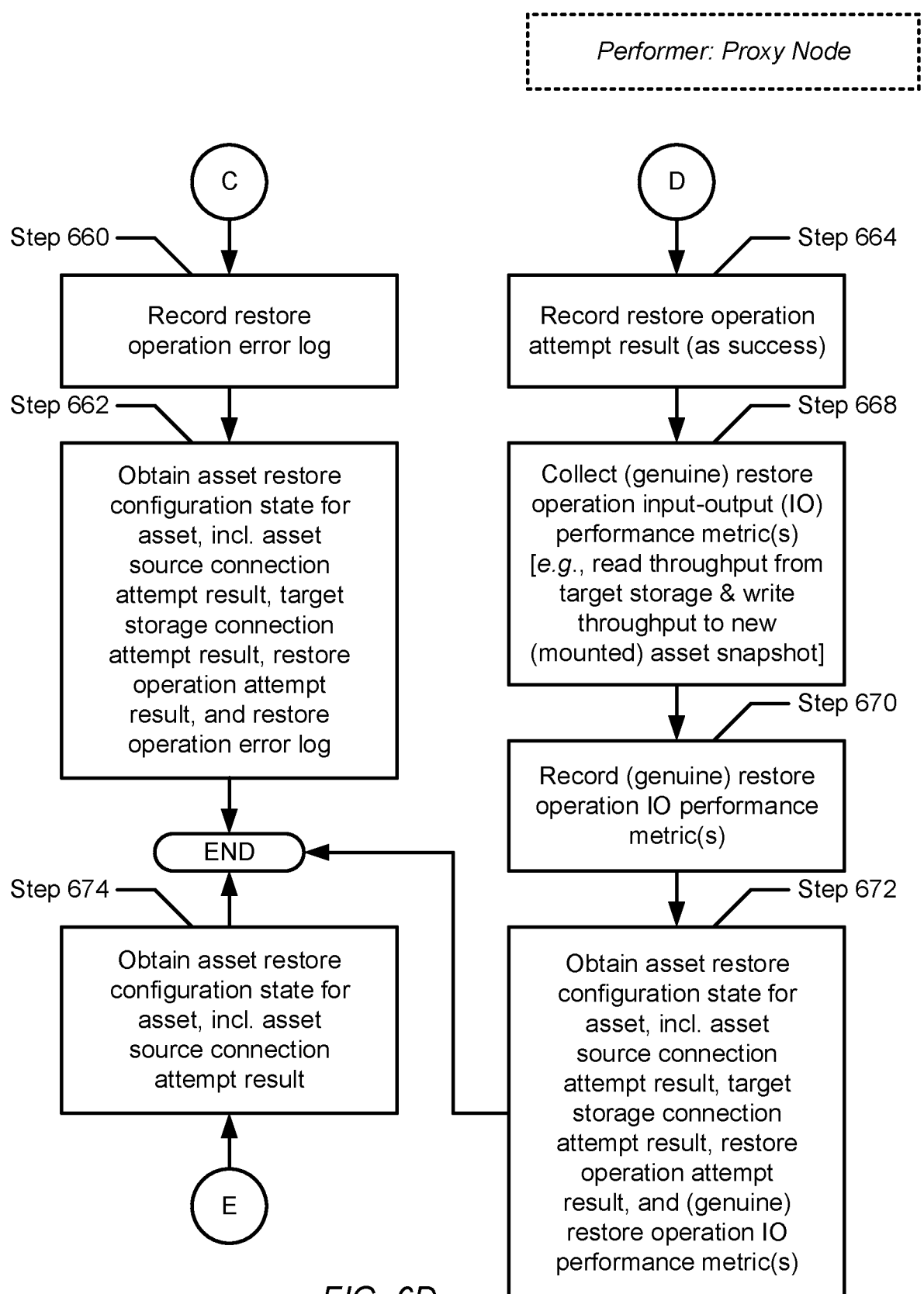

Turning to FIG. 6D, in Step 660, the restore operation error log (identified in Step 656) is recorded.

In Step 662, an asset restore configuration state, respective to the asset, is obtained. In one or many embodiment(s) described herein, the asset restore configuration state may refer to information that collectively summarizes said current viability of any enterprise information (e.g., asset data and/or metadata), stored on/by the said specified asset, towards undergoing any restore operation(s) that, at least in part, enable/support the protection of said enterprise information. Further, the asset restore configuration state may include or specify: the asset source connection attempt result (recorded in Step 608); the target storage connection attempt result (recorded in Step 648); the restore operation attempt result (recorded in Step 654); and the restore operation error log (recorded in Step 660).

In Step 664, following the alternate determination (made in Step 652) that a genuine restore operation (attempted in Step 650) succeeded, a restore operation attempt result is recorded. In one or many embodiment(s) described herein, the restore operation attempt result may refer to a piece of information reflective of the result obtained through the attempted performance of a genuine restore operation. Further, the restore operation attempt result may reflect said result as a success.

In Step 668, any number of genuine restore operation input-output (IO) performance metrics, respective to the genuine restore operation (determined to have been successfully performed in Step 652), is/are collected. In one or many embodiment(s) described herein, any genuine restore operation IO performance metric may refer to a measurable parameter reflecting a qualitative or quantitative assessment of the IO performance exhibited during the genuine restore operation. Examples of said genuine restore operation IO performance metric(s), respective to the genuine restore operation, may include: a read throughput—i.e., a maximum (empirical) amount or capacity of data/information (e.g., typically expressed in bits or bytes per second) that has been read from a data source (e.g., the target storage); and a write throughput—i.e., a maximum (empirical) amount or capacity of data/information (e.g., typically expressed in bits or bytes per second) that has been written to a data target (e.g., the mounted, new asset snapshot). Further, said genuine restore operation IO performance metric(s), respective to the genuine restore operation, is/are not limited to the aforementioned specific examples.

In Step 670, the genuine restore operation IO performance metric(s) (collected in Step 668) is/are recorded.

In Step 672, an asset restore configuration state, respective to the asset, is obtained. In one or many embodiment(s) described herein, the asset restore configuration state may refer to information that collectively summarizes said current viability of any enterprise information (e.g., asset data and/or metadata), stored on/by the said specified asset, towards undergoing any restore operation(s) that, at least in part, enable/support the protection of said enterprise information. Further, the asset restore configuration state may include or specify: the asset source connection attempt result (recorded in Step 608); the target storage connection attempt result (recorded in Step 648); the restore operation attempt result (recorded in Step 664); and the genuine restore operation IO performance metric(s) (recorded in Step 670).

In Step 674, following the alternate determination (made in Step 636) that the asset metadata (identified in Step 634) does not satisfy the genuine restore criteria (defined above— see e.g., Step 636), an asset restore configuration state, respective to the asset, is obtained. In one or many embodiment(s) described herein, the asset restore configuration state may refer to information that collectively summarizes said current viability of any enterprise information (e.g., asset data and/or metadata), stored on/by the said specified asset, towards undergoing any restore operation(s) that, at least in part, enable/support the protection of said enterprise information. Further, the asset restore configuration state may include or specify the asset source connection attempt result (recorded in Step 608).

Figure 7:
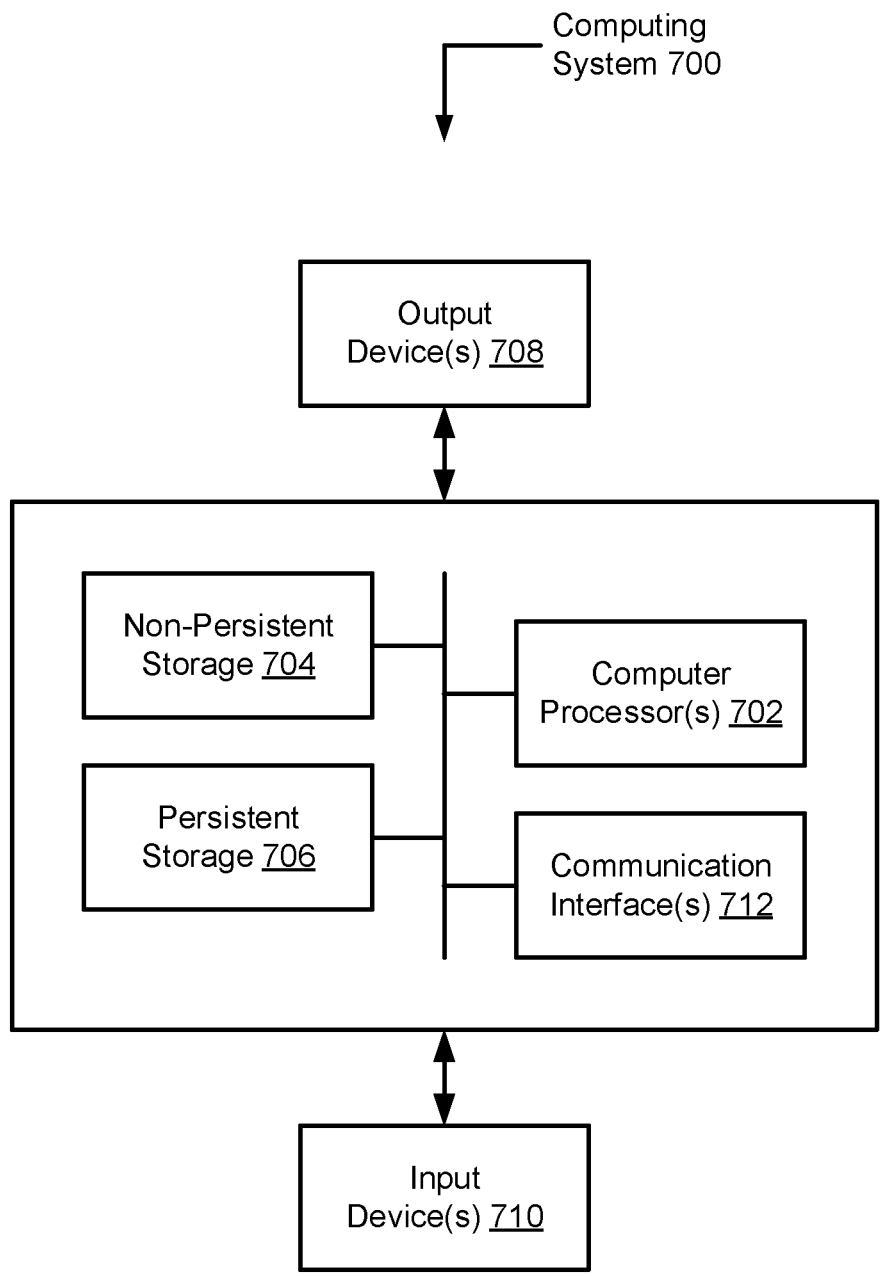
FIG. 7 shows an exemplary computing system in accordance with one or more embodiments described herein.

FIG. 7 shows an exemplary computing system in accordance with one or more embodiments described herein. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one or many embodiment(s) described herein, the computer processor(s) (702) may be an integrated circuit for processing instructions. For example, the computer processor(s) may be one or more cores or micro-cores of a central processing unit (CPU) and/or a graphics processing unit (GPU). The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one or many embodiment(s) described herein, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the technology has been described with respect to a limited number of embodiments, those skilled in the art, having benefit of this disclosure, will appreciate that other embodiments can be devised which do not depart from the scope of the embodiments as described herein. Accordingly, the scope of the embodiments described herein should be limited only by the attached claims.

What is claimed is:

1. A method for configuration checking of asset protection infrastructure, the method comprising:

receiving a configuration check request specifying an asset source, an asset hosted on the asset source, and a target storage;

performing an asset source configuration check of the asset source to obtain an asset source configuration state;

performing a target storage configuration check of the target storage to obtain a target storage configuration state;

extracting an asset source connection attempt result from the asset source configuration state;

extracting a target storage connection attempt result from the target storage configuration state;

making a first determination that the asset source connection attempt result and the target storage connection attempt result both reflect a successful result;

based on the first determination:
  performing an asset backup configuration check of a backup operation involving the asset, comprising:
    establishing, using a preferred asset source network interface, a connection to the asset source;
    creating an asset snapshot of the asset hosted on the asset source;
    mounting the asset snapshot to obtain a mounted asset snapshot;
    identifying, using the mounted asset snapshot, asset metadata descriptive of the asset;
    making a second determination that the asset metadata fails to satisfy genuine backup criteria;
    partitioning, based on the second determination and of the mounted asset snapshot, asset snapshot data into multiple asset snapshot data slices;
    performing a simulated backup operation of the multiple asset snapshot data slices from and to the mounted asset snapshot;
    collecting simulated backup operation input-output (IO) performance metrics for the simulated backup operation; and
    obtaining an asset backup configuration state comprising the simulated backup operation IO performance metrics;
  generating a configuration check response comprising the asset source configuration state, the asset backup configuration state, and the target storage configuration state; and
  returning the configuration check response in response to the configuration check request.

2. The method of claim 1, wherein performing the asset source configuration check of the asset source to obtain the asset source configuration state, comprises:
  recording, based on establishing the connection to the asset source, the asset source connection attempt result as a successful result;
  discovering a plurality of asset source network interfaces belonging to the asset source;
  collecting a plurality of asset source network interface performance metrics respectively for the plurality of asset source network interfaces; and
  identifying, based on the plurality of asset source network interface performance metrics, the preferred asset source network interface for the asset source from the plurality of asset source network interfaces,
  wherein the asset source configuration state comprises the preferred asset source network interface for the asset source.

3. The method of claim 2, wherein the asset source configuration state further comprises the asset source connection attempt result, a listing of the plurality of asset source network interfaces, and a listing of the plurality of asset source network interface performance metrics.

4. The method of claim 1, wherein performing the target storage configuration check of the target storage to obtain the target storage configuration state, comprises:
  recording, based on establishing a second connection to the target storage, the target storage connection attempt result as a successful result;
  discovering a plurality of target storage network interfaces belonging to the target storage;
  collecting a plurality of target storage network interface performance metrics respectively for the plurality of target storage network interfaces; and
  identifying, based on the plurality of target storage network interface performance metrics, a preferred target storage network interface for the target storage from the plurality of target storage network interfaces,
  wherein the target storage configuration state comprises the preferred target storage network interface for the target storage.

5. The method of claim 4, wherein the target storage configuration state further comprises the target storage connection attempt result, a listing of the plurality of target storage network interfaces, and a listing of the plurality of target storage network interface performance metrics.

6. The method of claim 1, wherein performing the asset backup configuration check of the backup operation involving the asset to obtain the asset backup configuration state, comprises:
  establishing, using a preferred asset source network interface, a connection to the asset source;
  creating an asset snapshot of the asset hosted on the asset source;
  mounting the asset snapshot to obtain a mounted asset snapshot;
  identifying, using the mounted asset snapshot, asset metadata descriptive of the asset;
  making a third determination that the asset metadata satisfies genuine backup criteria;
  establishing, based on the third determination and using a preferred target storage network interface, a second connection to the target storage;
  partitioning, of the mounted asset snapshot, asset snapshot data into multiple asset snapshot data slices;
  performing a genuine backup operation of the multiple asset snapshot data slices from the mounted asset snapshot to the target storage;
  collecting genuine backup operation input-output (IO) performance metrics for the genuine backup operation; and
  generating a backup identifier (ID) for the genuine backup operation and to associate with an asset data copy of the asset on the target storage,
  wherein the asset data copy comprises the multiple asset snapshot data slices,
  wherein the asset backup configuration state comprises the genuine backup IO performance metrics and the backup ID.

7. The method of claim 1, the method further comprising:
  prior to generating the configuration check response and after performing the asset backup configuration check:
    making a third determination that the asset backup configuration state comprises a backup identifier (ID) assigned to the backup operation following a completion thereof and associated with an asset data copy of the asset on the target storage; and
    performing, based on the third determination, an asset restore configuration check of a restore operation involving the asset to obtain asset restore configuration state,
    wherein the configuration check response further comprises the asset restore configuration state.

8. The method of claim 7, wherein performing the asset restore configuration check of the restore operation involving the asset to obtain the asset restore configuration state, comprises:
  establishing, using the preferred asset source network interface, the connection to the asset source;
  creating a second asset snapshot of the asset hosted on the asset source;
  mounting the second asset snapshot to obtain a second mounted asset snapshot;

identifying, using the second mounted asset snapshot, second asset metadata descriptive of the asset;
making a fourth determination that the second asset metadata satisfies genuine restore criteria;
establishing, based on the fourth determination and using a preferred target storage network interface, a second connection to the target storage;
performing a genuine restore operation of the asset data copy from the target storage to the second mounted asset snapshot; and
collecting genuine restore operation IO performance metrics for the genuine restore operation, wherein the asset restore configuration state comprises the genuine restore operation IO performance metrics.

9. A non-transitory computer readable medium (CRM) comprising computer readable program code, which when executed by a computer processor, enables the computer processor to perform a method for configuration checking of asset protection infrastructure, the method comprising:
receiving a configuration check request specifying an asset source, an asset hosted on the asset source, and a target storage;
performing an asset source configuration check of the asset source to obtain an asset source configuration state;
performing a target storage configuration check of the target storage to obtain a target storage configuration state;
extracting an asset source connection attempt result from the asset source configuration state;
extracting a target storage connection attempt result from the target storage configuration state;
making a first determination that the asset source connection attempt result and the target storage connection attempt result both reflect a successful result;
based on the first determination:
performing an asset backup configuration check of a backup operation involving the asset, comprising:
establishing, using a preferred asset source network interface, a connection to the asset source;
creating an asset snapshot of the asset hosted on the asset source;
mounting the asset snapshot to obtain a mounted asset snapshot;
identifying, using the mounted asset snapshot, asset metadata descriptive of the asset;
making a second determination that the asset metadata fails to satisfy genuine backup criteria;
partitioning, based on the second determination and of the mounted asset snapshot, asset snapshot data into multiple asset snapshot data slices;
performing a simulated backup operation of the multiple asset snapshot data slices from and to the mounted asset snapshot;
collecting simulated backup operation input-output (IO) performance metrics for the simulated backup operation; and
obtaining an asset backup configuration state comprising the simulated backup operation IO performance metrics;
generating a configuration check response comprising the asset source configuration state, the asset backup configuration state, and the target storage configuration state; and
returning the configuration check response in response to the configuration check request.

10. The non-transitory CRM of claim 9, wherein performing the asset source configuration check of the asset source to obtain the asset source configuration state, comprises:
recording, based on establishing the connection to the asset source, the asset source connection attempt result as a successful result;
discovering a plurality of asset source network interfaces belonging to the asset source;
collecting a plurality of asset source network interface performance metrics respectively for the plurality of asset source network interfaces; and
identifying, based on the plurality of asset source network interface performance metrics, the preferred asset source network interface for the asset source from the plurality of asset source network interfaces,
wherein the asset source configuration state comprises the preferred asset source network interface for the asset source.

11. The non-transitory CRM of claim 9, wherein performing the target storage configuration check of the target storage to obtain the target storage configuration state, comprises:
recording, based on establishing a second connection to the target storage, the target storage connection attempt result as a successful result;
discovering a plurality of target storage network interfaces belonging to the target storage;
collecting a plurality of target storage network interface performance metrics respectively for the plurality of target storage network interfaces; and
identifying, based on the plurality of target storage network interface performance metrics, a preferred target storage network interface for the target storage from the plurality of target storage network interfaces,
wherein the target storage configuration state comprises the preferred target storage network interface for the target storage.

12. The non-transitory CRM of claim 9, wherein performing the asset backup configuration check of the backup operation involving the asset to obtain the asset backup configuration state, comprises:
establishing, using a preferred asset source network interface, a connection to the asset source;
creating an asset snapshot of the asset hosted on the asset source;
mounting the asset snapshot to obtain a mounted asset snapshot;
identifying, using the mounted asset snapshot, asset metadata descriptive of the asset;
making a third determination that the asset metadata satisfies genuine backup criteria;
establishing, based on the third determination and using a preferred target storage network interface, a second connection to the target storage;
partitioning, of the mounted asset snapshot, asset snapshot data into multiple asset snapshot data slices;
performing a genuine backup operation of the multiple asset snapshot data slices from the mounted asset snapshot to the target storage;
collecting genuine backup operation input-output (IO) performance metrics for the genuine backup operation; and
generating a backup identifier (ID) for the genuine backup operation and to associate with an asset data copy of the asset on the target storage,
wherein the asset data copy comprises the multiple asset snapshot data slices, wherein the asset backup configuration state comprises the genuine backup IO performance metrics and the backup ID.

13. The non-transitory CRM of claim 9, the method further comprising:
prior to generating the configuration check response and after performing the asset backup configuration check:
making a third determination that the asset backup configuration state comprises a backup identifier (ID) assigned to the backup operation following a completion thereof and associated with an asset data copy of the asset on the target storage; and
performing, based on the third determination, an asset restore configuration check of a restore operation involving the asset to obtain asset restore configuration state,
wherein the configuration check response further comprises the asset restore configuration state.

14. The non-transitory CRM of claim 13, wherein performing the asset restore configuration check of the restore operation involving the asset to obtain the asset restore configuration state, comprises:
establishing, using the preferred asset source network interface, the connection to the asset source;
creating a second asset snapshot of the asset hosted on the asset source;
mounting the second asset snapshot to obtain a second mounted asset snapshot;
identifying, using the second mounted asset snapshot, second asset metadata descriptive of the asset;
making a fourth determination that the second asset metadata satisfies genuine restore criteria;
establishing, based on the fourth determination and using a preferred target storage network interface, a second connection to the target storage;
performing a genuine restore operation of the asset data copy from the target storage to the second mounted asset snapshot; and
collecting genuine restore operation IO performance metrics for the genuine restore operation,
wherein the asset restore configuration state comprises the genuine restore operation IO performance metrics.

15. A system, the system comprising:
an asset source comprising an asset;
a target storage; and
a proxy node operatively connected to the asset source and the target storage, and comprising a computer processor configured to perform a method for configuration checking of asset protection infrastructure, the method comprising:
receiving a configuration check request specifying the asset source and the target storage;
performing an asset source configuration check of the asset source to obtain an asset source configuration state;
performing a target storage configuration check of the target storage to obtain a target storage configuration state;
extracting an asset source connection attempt result from the asset source configuration state;
extracting a target storage connection attempt result from the target storage configuration state;
making a first determination that the asset source connection attempt result and the target storage connection attempt result both reflect a successful result;
based on the first determination:
performing an asset backup configuration check of a backup operation involving the asset, comprising:
establishing, using a preferred asset source network interface, a connection to the asset source;
creating an asset snapshot of the asset hosted on the asset source;
mounting the asset snapshot to obtain a mounted asset snapshot;
identifying, using the mounted asset snapshot, asset metadata descriptive of the asset;
making a second determination that the asset metadata fails to satisfy genuine backup criteria;
partitioning, based on the second determination and of the mounted asset snapshot, asset snapshot data into multiple asset snapshot data slices;
performing a simulated backup operation of the multiple asset snapshot data slices from and to the mounted asset snapshot;
collecting simulated backup operation input-output (IO) performance metrics for the simulated backup operation; and
obtaining an asset backup configuration state comprising the simulated backup operation IO performance metrics;
generating a configuration check response comprising the asset source configuration state, the asset backup configuration state, and the target storage configuration state; and
returning the configuration check response in response to the configuration check request.

16. The system of claim 15, the system further comprising:
a data management service operatively connected to the proxy node, and comprising a second computer processor configured to perform a second method, the second method comprising:
submitting the configuration check request to the proxy node; and
receiving the configuration check response from the proxy node.

* * * * *